United States Patent
Machida

(10) Patent No.: US 7,606,874 B2
(45) Date of Patent: Oct. 20, 2009

(54) NETWORK SYSTEM, METHOD AND APPARATUS FOR PROCESSING INFORMATION, AND CONTROL PROGRAM

(75) Inventor: Haruo Machida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 11/418,025

(22) Filed: May 5, 2006

(65) Prior Publication Data

US 2006/0206605 A1 Sep. 14, 2006

Related U.S. Application Data

(62) Division of application No. 10/011,975, filed on Dec. 11, 2001, now Pat. No. 7,065,564.

(30) Foreign Application Priority Data

| Dec. 22, 2000 | (JP) | ............................ 2000-391202 |
| Nov. 20, 2001 | (JP) | ............................ 2001-354704 |
| Nov. 20, 2001 | (JP) | ............................ 2001-355021 |

(51) Int. Cl.
*G06F 15/16* (2006.01)
(52) U.S. Cl. .................. 709/217; 709/203; 709/218; 709/220; 709/222; 709/227; 375/219; 711/1
(58) Field of Classification Search .............. 709/203, 709/217, 218, 219, 220, 222, 227; 375/219; 711/1
See application file for complete search history.

(56) References Cited

U.S. PATENT DOCUMENTS

| 6,269,481 | B1 | 7/2001 | Perlman et al. ............. 717/178 |
| 6,493,104 | B1 | 12/2002 | Cromer et al. ............. 358/1.15 |
| 6,594,690 | B2 * | 7/2003 | Cantwell .................... 709/217 |
| 6,693,722 | B1 | 2/2004 | Mixer, Jr. .................. 358/1.15 |
| 6,694,354 | B1 * | 2/2004 | Elg ............................ 709/217 |
| 6,725,260 | B1 * | 4/2004 | Philyaw ..................... 709/220 |
| 6,789,111 | B1 | 9/2004 | Brockway et al. ........... 709/222 |
| 2002/0073415 | A1 | 6/2002 | Kim et al. |
| 2002/0083227 | A1 | 6/2002 | Machida ........................ 710/8 |
| 2002/0095501 | A1 * | 7/2002 | Chiloyan et al. ............ 709/227 |
| 2003/0120624 | A1 | 6/2003 | Poppenga et al. |

FOREIGN PATENT DOCUMENTS

| JP | 03-168691 | 7/1991 |
| JP | 09-218777 | 8/1997 |
| JP | 11-095985 | 4/1999 |
| JP | 2000-039987 | 2/2000 |
| JP | 2000-185450 | 7/2000 |
| JP | 2001-230892 | 8/2001 |

* cited by examiner

*Primary Examiner*—Jinsong Hu
(74) *Attorney, Agent, or Firm*—Fitzpatrick, Cella, Harper & Scinto

(57) ABSTRACT

Property information of a driver is newly set or updated via a simple operation on a network. First, property information is created. When a driver is installed or updated, the created property information associated with the driver is transmitted from a server device to a client device, which in turn sets the property information of the driver.

21 Claims, 22 Drawing Sheets

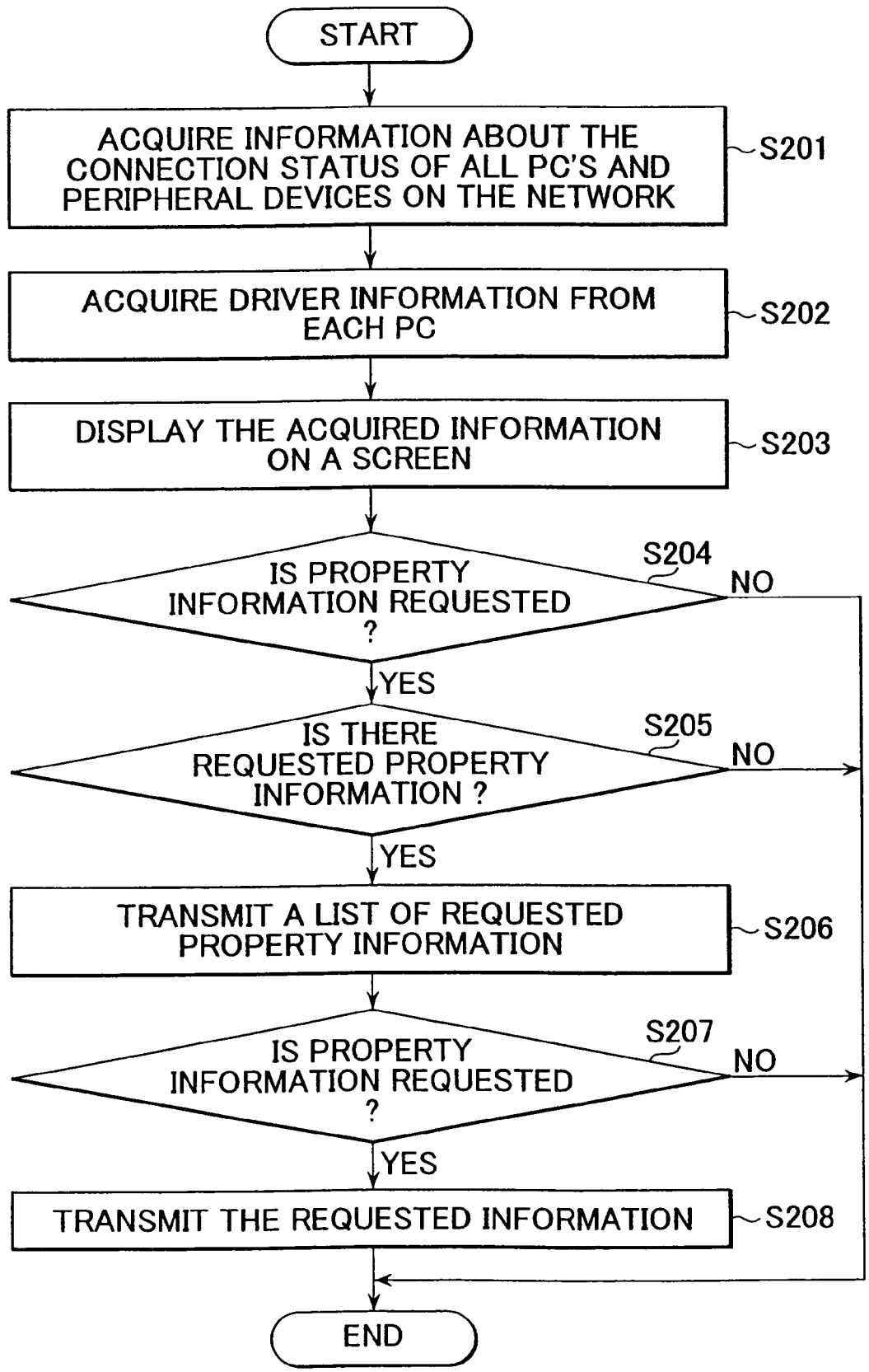

FIG.3

| PC NAME | | SNPC00 |
|---|---|---|
| IP ADDRESS | | 100.100.100.1 |
| OS TYPE | | Windows98 |
| USER NAME | | suzuki |
| NUMBER OF DRIVERS | | 8 |
| 1 | DEVICE TYPE | PRINTER |
| | DRIVER NAME | LASER-830 |
| | VERSION | 1.00.00 |
| | OUTPUT PORT | LOCAL |
| | COMMON NAME | LASER-830 |
| | DRIVER INFORMATION ADDRESS | 0x10000 |
| | PROPERTY INFORMATION NAME | DEFAULT |
| | PROPERTY INFORMATION ADDRESS | 0x50000 |
| 2 | DEVICE TYPE | PRINTER |
| | DRIVER NAME | LASER-2160 |
| | VERSION | 1.00.00 |
| | OUTPUT PORT | LOCAL |
| | COMMON NAME | 0 |
| | DRIVER INFORMATION ADDRESS | 0x11000 |
| | PROPERTY INFORMATION NAME | 2in1 OUTPUT |
| | PROPERTY INFORMATION ADDRESS | 0x51000 |
| 3 | DEVICE TYPE | PRINTER |
| | DRIVER NAME | INKJET-10V |
| | VERSION | 1.00.00 |
| | OUTPUT PORT | ¥¥NOTEPC01¥BJ-10V |
| | COMMON NAME | INKJET-10V |
| | DRIVER INFORMATION ADDRESS | 0x12000 |
| | PROPERTY INFORMATION NAME | DEFAULT |
| | PROPERTY INFORMATION ADDRESS | 0x52000 |
| | ⋮ | |
| 8 | DEVICE TYPE | SCANNER |
| | DRIVER NAME | Scan FB620 |
| | VERSION | 1.00.00 |
| | OUTPUT PORT | ¥¥snpc01¥FB620 |
| | COMMON NAME | FB620 |
| | DRIVER INFORMATION ADDRESS | 0x17000 |
| | PROPERTY INFORMATION NAME | DEFAULT |
| | PROPERTY INFORMATION ADDRESS | 0x57000 |
| DRIVER INFORMATION | | |
| PROPERTY INFORMATION | | |

FIG.4

| PAGE SETTING | PAGE LAYOUT | | |
|---|---|---|---|
| | STAMP TYPE | | |
| | STAMP OUTPUT POSITION | | |
| FINISHING | PRINTING METHOD | SINGLE-SIDED | |
| | | DOUBLE-SIDED | |
| | | BINDING | AT THE RIGHT-HAND END |
| | | | AT THE LEFT-HAND END |
| | | AT THE CENTER | |
| | | (DETAILS OF BINDING SETTINGS) | |
| | SHEET OUTPUT METHOD | SORT | |
| | | GROUP | |
| | | STAPLE | AT THE UPPER LEFT (ONE POSITION) |
| | | | AT THE LOWER LEFT (ONE POSITION) |
| | | | AT THE LEFT-HAND END (TWO POSITIONS) |
| | | ROTATE | |
| | | DESIGNATION OF THE STAPLING POSITION | |
| SHEET FEEDING | PRINT ALL PAGES ON THE SAME TYPE OF SHEETS | | |
| | SPECIFY THE TYPE OF SHEETS FOR THE FIRST AND LAST PAGES | | |
| | SPECIFY THE TYPE OF SHEETS FOR THE FIRST, SEND, AND LAST PAGES | | |
| | INSERT A SHEET BETWEEN ADJACENT TRANSPARENCY SHEETS | | |
| | ALSO PRINT ON INSERTED SHEETS | | |
| | SHEET FEEDING SETTING | | |
| PRINT QUALITY | RESOLUTION | | |
| | GRAY SETTING | | |
| | CATALOGUE PRINTING | | |
| | FONT SETTING | | |
| | INTERNAL SPOOLING SETTING | | |

NETWORK SYSTEM, METHOD AND APPARATUS FOR PROCESSING INFORMATION, AND CONTROL PROGRAM

This application is a divisional of application Ser. No. 10/011,975, filed Dec. 11, 2001, now allowed, the contents of which are incorporated by reference herein.

BACKGROUND OF THE INVENTION

1. Field of the Invention

The present invention relates to a network system, a method and apparatus for processing information, and a control program, and more specifically to a network system, a method and apparatus for processing information, and a control program, for managing a personal computer or a peripheral device connected via a communication medium.

2. Description of the Related Art

In recent years, as personal computers (hereinafter referred to as PCs), and peripheral devices such as a printer, a scanner, and a digital camera are becoming very popular, a network such as a LAN (Local Area Network) has also become popular. As a result, there is an increasing need for sharing a printer, a modem, a scanner or the like among a plurality of PCs on a network. A large number of drivers for driving such peripheral devices are available, and methods of installing such drivers are also available.

However, when an upgraded version of a driver of a peripheral device becomes available to achieve an improved function or for another reason, replacement of the driver with the upgraded version must be performed by a user. Upgrading a driver by a user is generally performed as follows. New driver information is stored in a particular folder of a PC (such as a server PC) shared on the network, and drivers installed on the respective PCs are separately updated in accordance with the driver information stored in the particular folder.

However, the above-described method of upgrading drivers has the following problems. Each driver includes user information such as layout information or font information that is set as property information, and such user information is reset into an initial state when the upgrading is performed. Furthermore, when there is common device option information or the like that is set in a network system, such information is also reset into an initial state. Therefore, it is necessary to again set the property information of the driver after upgrading the driver. Thus, a troublesome and time consuming operation is required to set the property information after upgrading the driver. Besides, the complexity of the setting operation can cause the property information to be incorrectly set.

Thus, to avoid the above problems, there is a need for automatically upgrading a driver. For example, it will be useful to upgrade all drivers of PCs in response to a command issued by a system manager at a server PC or the like. This makes it unnecessary for a user of each PC to update the driver in accordance with new driver information store in a particular folder.

However, in practice, the procedure of installing, upgrading, and setting up a driver varies from a device to device. Besides, a troublesome operation is necessary to select the type of the driver depending on an environment in which the device or the client device is used. Furthermore, a troublesome operation is also required to add or modify a driver and set property information of the driver in accordance with a command issued by each client device. Thus, the problem is that the operation efficiency is very low.

As described above, in the case where setting of software of PCs is performed by users of respective PCs or by a system manager, a very troublesome task has to be performed in a very low efficiency manner. In recent years, in the case of a large-scale system, the number of PCs to which software is installed is increasing. Thus, it is necessary to set the properties of drivers of a large number of PCs after installing the drivers. Thus, users or system managers have to set a large number of PCs, and this can cause an incorrect setting.

SUMMARY OF THE INVENTION

In view of the above, it is an object of the present invention to provide a technique of easily updating property information via a network.

It is another object of the present invention to provide a technique of updating a driver existing on a client device such that property information of the driver is transmitted from a server device to the client device and the setting of the driver is performed at the client device in accordance with the property information transmitted from the server device, thereby ensuring that the setting of the driver in terms of the property information is correctly performed without needing a troublesome operation.

It is another object of the present invention to provide a technique of push-installing a driver and setting property information of that driver in accordance with a setup command issued by a server device, without needing a troublesome operation at each client device.

According to an aspect of the present invention, to achieve at least one of the above objects, there is provided an information processing device that communicates with a client device, wherein the information processing device comprises recognition means for recognizing a client device to which property information associated with driver information is to be installed, and transmission control means for controlling a process of transmitting, to the client device, the property information and a setup command to set up the property information.

According to another aspect of the present invention, there is provided an information processing device that communicates with a server device, wherein the information processing device comprises input means for inputting property information associated with driver information and a setup command from the server device, and property information input means for inputting the property information into the information processing device in accordance with the setup command so that the driver information in the information processing device can recognize the property information.

According to still another aspect of the present invention, there is provided an information processing device that communicates with a client device, comprising recognition means for recognizing a client device to which driver information is to be installed, and transmission control means for controlling a process of transmitting the driver information without waiting for a driver information transmission request from the client device, wherein the transmission control means further controls a process of transmitting property information associated with the driver information.

Further objects, features and advantages of the present invention will become apparent from the following description of the preferred embodiments with reference to the attached drawings.

BRIEF DESCRIPTION OF THE DRAWINGS

FIG. 2 is a flow chart of a process performed by a PC functioning as a server device.

FIG. 3 is a diagram illustrating an example of a driver information structure.

FIG. 4 is a diagram illustrating an example of a property information structure.

DESCRIPTION OF THE PREFERRED EMBODIMENTS

The present invention is described in further detail below with reference to embodiments in conjunction with the accompanying drawings.

More specifically, embodiments of a network system, a method and apparatus for processing information, and a control program according to the present invention are described with reference to the accompanying drawings.

Figure 1:
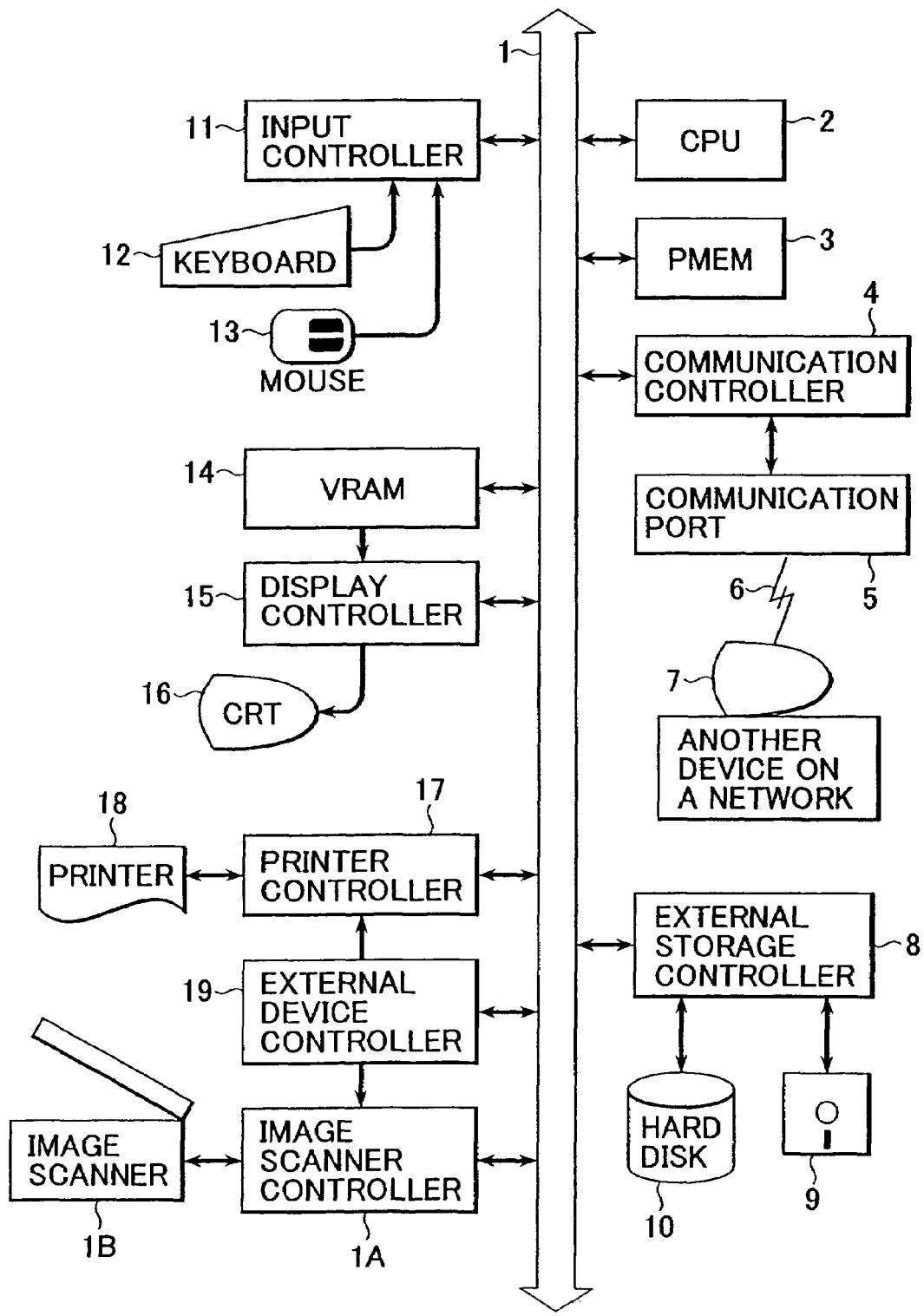
FIG. 1 is a block diagram illustrating a general structure of a device according to an embodiment of the present invention.

FIG. 1 is a block diagram illustrating the construction of a device according to an embodiment of the present invention. That is, a client device and a server device such as an installation server device according to the present invention may be preferably realized using a PC or a work station having a construction such as that shown in FIG. 1. In FIG. 1, reference numeral 1 denotes a system bus via which various blocks described below are connected to each other.

Reference numeral 2 is a CPU (Central Processing Unit). Reference numeral 3 denotes a program memory (hereinafter, referred to as a PMEM). A program is selectively read from a hard disk into the PMEM and executed by the CPU 2. The PMEM also serves as a text memory for storing data inputted via a keyboard 12.

Reference numeral 4 denotes a communication controller for controlling inputting or outputting data via a communication port 5. A signal outputted from the communication port 5 is transmitted via a communication line 6 to a communication port of another apparatus (such as that denoted by reference numeral 7 in FIG. 1) on the network. Communication with a printer or a scanner shared on the network is performed via this communication controller 4. In the present embodiment, a network such as a LAN (Local Area Network) is employed as the communication line 6. However, in the present invention, the communication line 6 is not limited to a network such as a LAN. Another type of communication line such as a public communication line may be connected to the communication controller 4 via the communication port 5.

Reference numeral 8 denotes an external storage controller. A floppy disk (FD) 9 and a hard disk (HD) 10 are used to store data files.

Reference numeral 11 denotes an input controller, to which input devices such as a keyboard 12 and a mouse 13 are connected. A user can input a system operation command via the keyboard 12. The mouse 13 serves as a pointing device (PD) for pointing to an image such as an icon or the like displayed on a CRT (Cathode Ray Tube) 16. More specifically, a command to perform image processing can be issued by arbitrarily moving a cursor displayed on the CRT 16 so as to point to a desired command icon in a command menu. The mouse 13 can also be used to point to image data to be processed and to point to a position at which image data should be drawn.

Reference numeral 14 denotes a video image memory (VRAM). Reference numeral 15 denotes a display controller. Data is displayed on the CRT 16 in accordance with data stored, in the form of bitmapped data, in the VRAM 14.

Reference numeral 17 denotes a printer controller that controls an operation of outputting data to a printer 18 connected to the printer controller 17. Reference numeral 1A denotes an image scanner controller that controls an image scanner 1B connected thereto.

Although, in the present embodiment, the program is stored in the PMEM 3, the program may also be stored in a storage medium such as the hard disk 10 or the floppy disk 9 or in another device connected to the network.

Referring to FIGS. 2 to 9, the present embodiment of the invention is described. FIG. 2 is a flow chart illustrating an operation process performed by a PC functioning as a server device. First, in step S201, the server device acquires information about the connection status of all PCs and peripheral devices on the network.

Then in step S202, the server device acquires driver setup information, which is a typical example of driver information, of peripheral devices of each PC. Herein, specific examples of drivers of peripheral devices are those of a printer, a scanner, a digital camera, and a facsimile machine. The setup information may be acquired, for example, by activating a driver information acquisition module installed in each PC and transmitting the acquired driver information to the server device. In step S203, the server device displays the connection information of all PCs and peripheral devices on the network on the basis of the acquired information. In this specific example described herein, the connection information is described in a driver information structure.

FIG. 3 illustrates an example of a set-up driver information structure. The driver information structure includes a PC name, an IP address, an OS type, a user name, the number of device drivers, device driver information of each device driver, and property information. The device driver information of each device driver includes a device type such as a printer or a scanner, a driver name, version information, an output port, a common name, driver information address, property information name, and property information address. In the specific example shown in FIG. 3, device driver information described first in the driver information structure is for a printer and includes data indicating that "LASER-830" is assigned as a driver name, data indicating that a version number is "1.00.00", data indicating that a local port is specified as an output port, data indicating that "LASER-830" is assigned as a common name, data indicating that "0x100001" is assigned as a driver information address, data indicating that a default property information name is employed, and data indicating that "0x50000" is assigned as a property information address. Information is described in a similar manner for each PC.

FIG. 4 illustrates an example of a property information structure. In this example shown in FIG. 4, the property information is of the printer driver and includes data indicating page setting, finishing setting, sheet feeding, and print quality. The property information includes information that is referred to by the driver module when printing is performed. This property information structure varies depending upon the driver type and the version of the driver. The property information may be stored in a registry of an OS. Property information may also be provided such that property information is inputted into a driver, and the inputted property information is outputted as an external file by the driver.

Figure 14:
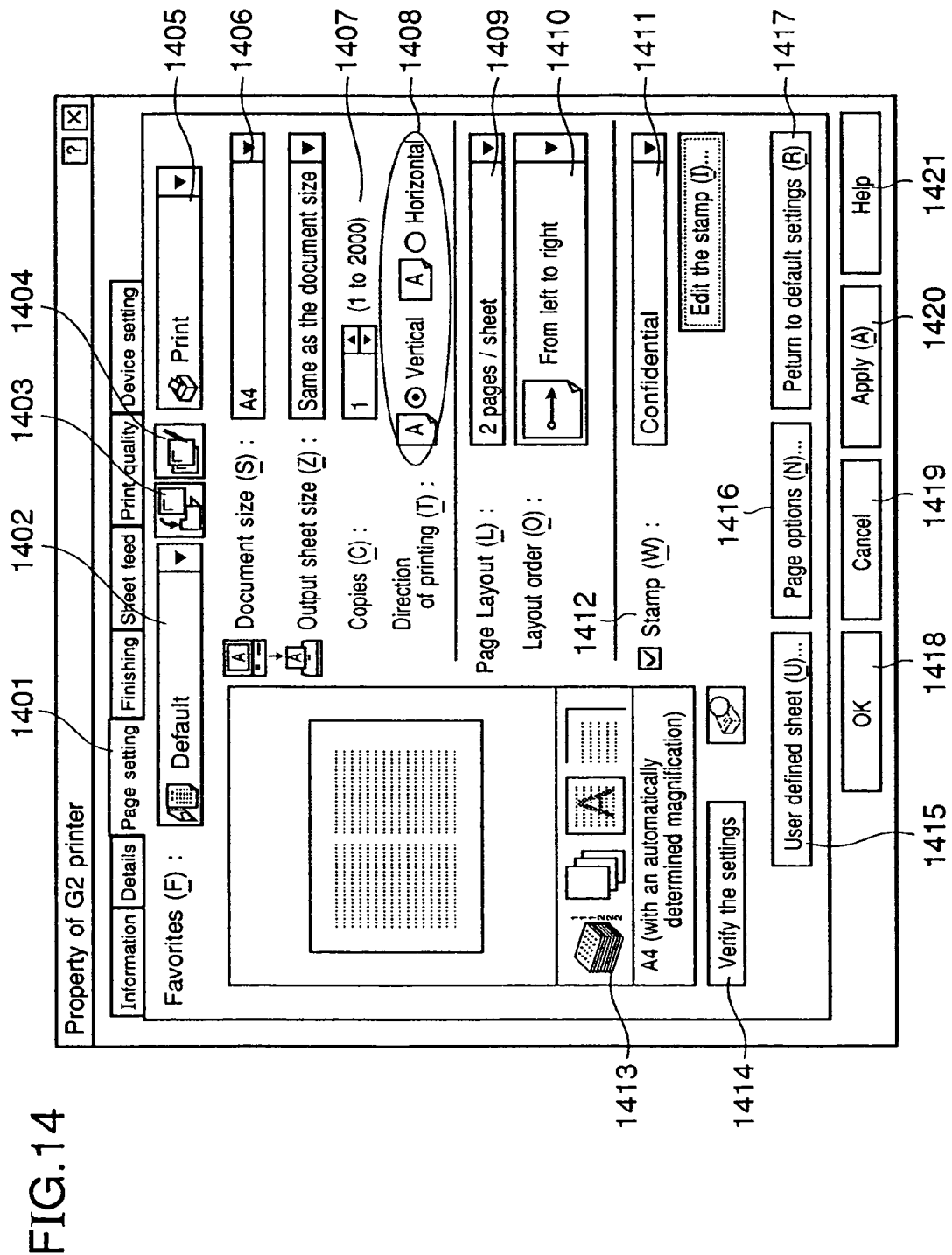
FIG. 14 is a diagram illustrating a screen for setting a driver.

FIG. 14 illustrates a screen for setting a driver. A process performed by a driver to generate property information and output it as an external file is described below. When the screen for setting the driver is displayed on a CRT of a server device, a user issues a command or inputs data via a GUI (graphical user interface) displayed on the screen by operating a pointing device or a keyboard. The property information may include data specifying a finishing manner such as stapling, data specifying print quality, and data specifying sheet feeding manner. In the example shown in FIG. 14, of various tabs 1401 for selecting an item of property information to be set, a page setting tab is selected. Reference numeral 1402 denotes a favorite selection box for selecting user's favorite property information. Reference numeral 1403 denotes a property information addition button. If this button 1403 is clicked, a property information addition screen appears as will be described later with reference to FIG. 15. Reference numeral 1404 denotes a property information edit button. If this button 1404 is clicked, a favorite information edit screen appears shown in FIG. 17 appears. This favorite information edit screen will be described in further detail later. Reference numerals 1406 to 1413 denote parameter selection boxes for inputting parameters associated with the property information. In these parameter selection boxes, it is possible to select or designate an output sheet size 1406, a number of copies 1407, a printing direction 1408, a page layout such as a 2-in-1 layout 1409, a page layout order 1410, optional printing of a stamp that may include a watermark embedded in print data 1412, a type of the stamp 1411, and a device controlling manner such as stapling or sorting (for example, in a face-up or face-down fashion). Reference numeral 1414 is a property information confirmation button. If this button 1414 is clicked, a screen (not shown) for confirming the settings of the parameters associated with the property information appears. The above-described parameters selected or designated by the system manager by operating buttons or boxes 1401 to 1421 are stored as property information in the driver of the server device.

Figure 15:
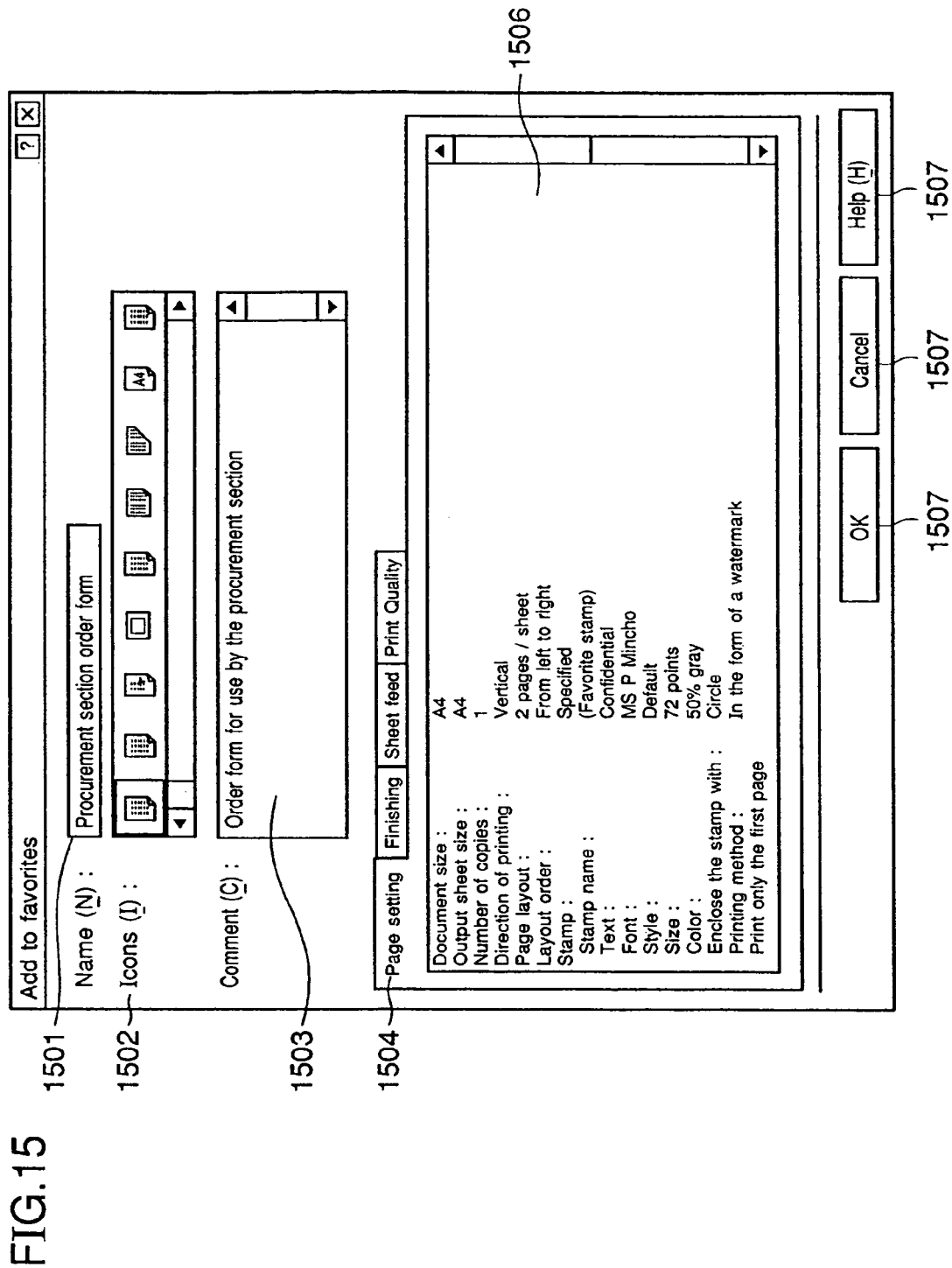
FIG. 15 is a diagram illustrating a screen for adding property information.

FIG. 15 illustrates the property information addition screen. In FIG. 15, reference numeral 1501 denotes a name input box for inputting a property information name. Reference numeral 1502 denotes an icon selection box for selecting an icon corresponding to the property information. Reference numeral 1503 denotes a comment input box for inputting a comment concerning the property information. Reference numeral 1504 denotes a property information selection tab. Reference numeral 1506 denotes a property information display box. Reference numeral 1507 denotes screen switching buttons. If an "OK" button is clicked, inputted/selected parameters (some of which is displayed in the box 1506) of the driver are registered as the property information. In the example shown in FIG. 15, the property information is registered under a property information name "Procurement section order form". After completion of the registration, a screen shown in FIG. 16 appears.

Figure 16:
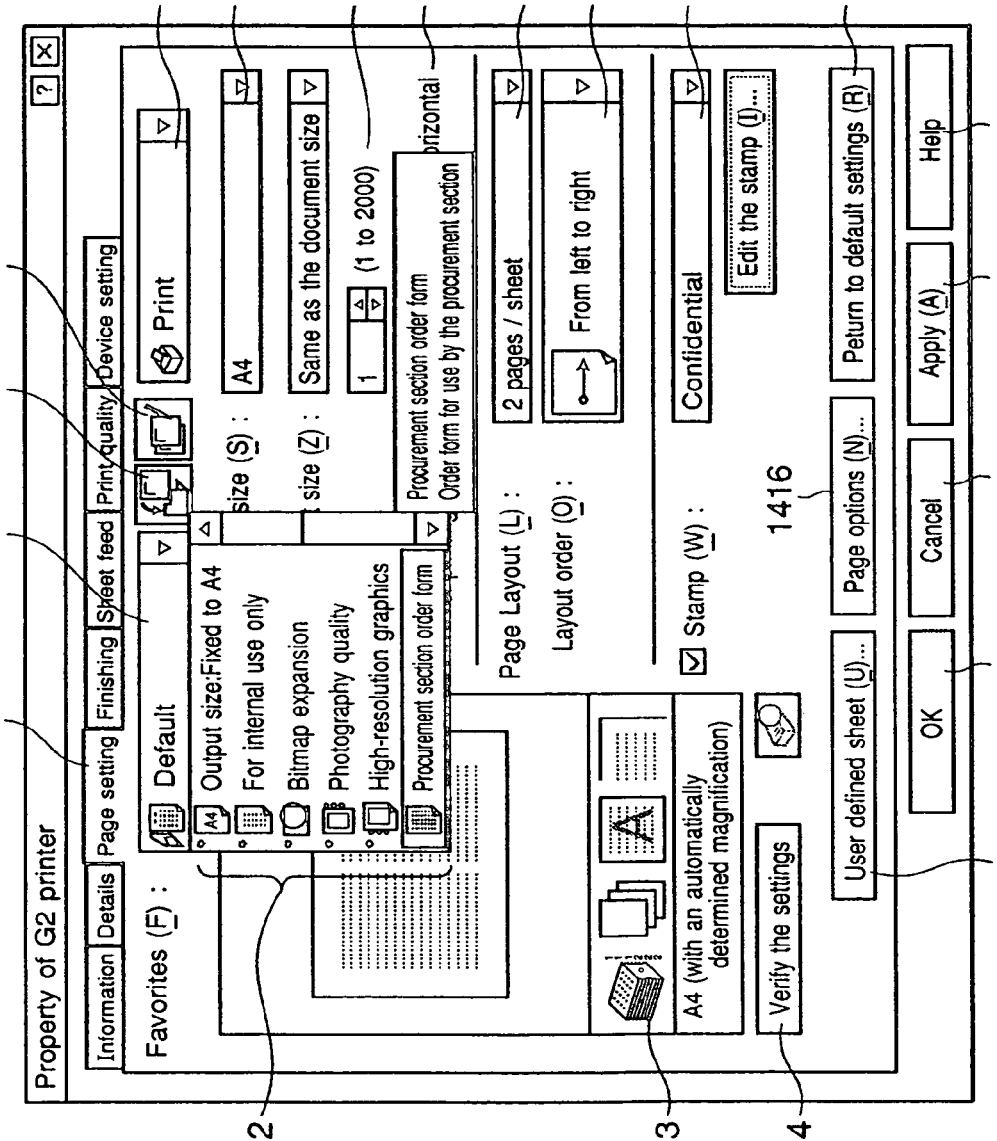
FIG. 16 is a diagram illustrating a screen for setting property information.

FIG. 16 illustrates a screen for setting property information. In the example shown in FIG. 16, property information with the property information name of "Procurement section order form" is created and the property information name "Procurement section order form" is registered as denoted by reference numeral 1422. Once the property information has been created and its name has been registered, the property information with the property information name of "Procurement section order form" can be selected in the property information selection box 1402. If the property information with the property information name of "Procurement section order form" is selected in this way, the parameters stored in the driver are called, and these parameters are reflected when printing is performed.

Figure 17:
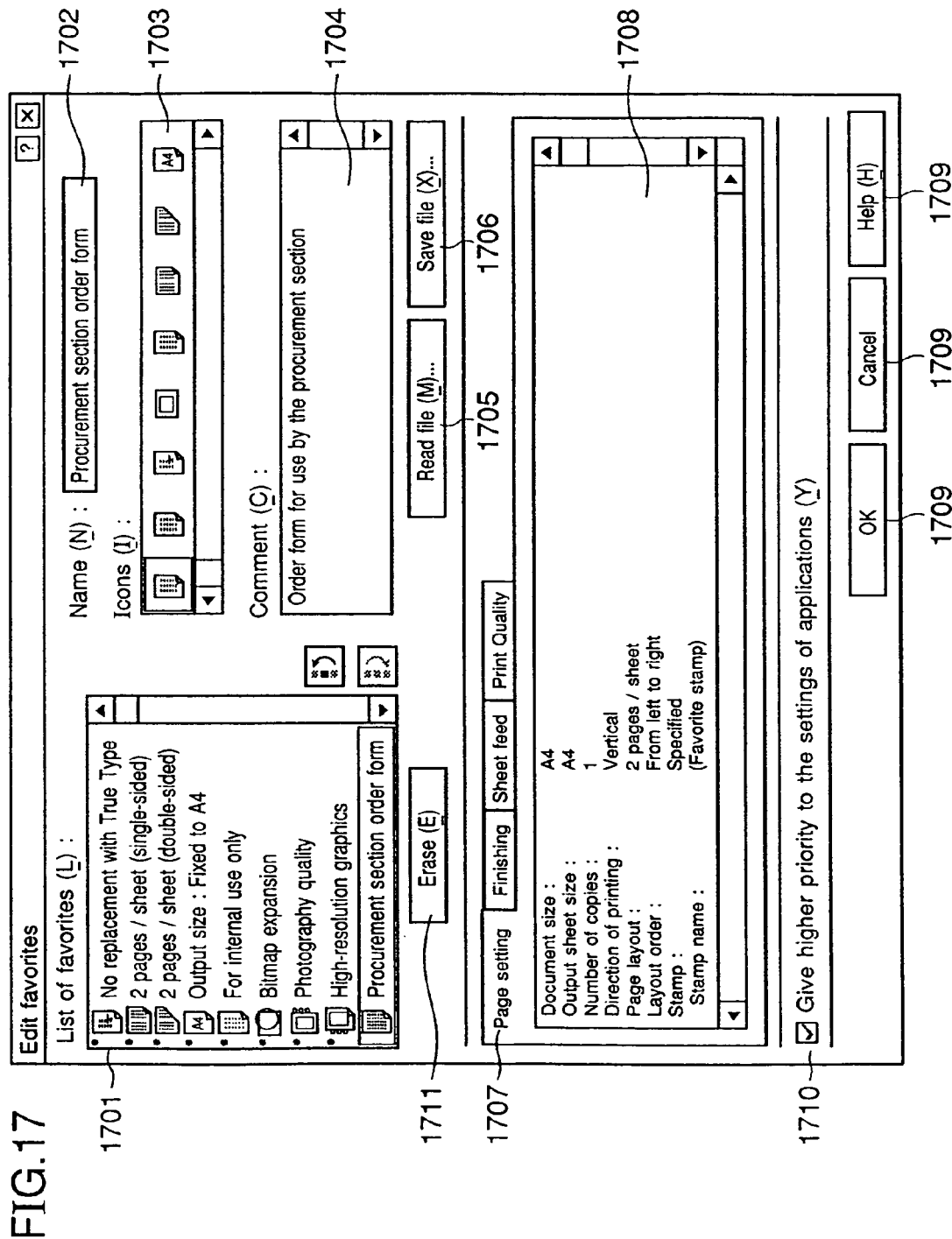
FIG. 17 is a diagram illustrating a screen for editing property information.

FIG. 17 illustrates a property information edit screen. In this screen, if a property information name to be deleted is selected in a property information selection box 1701, and if a "Erase" button is then pressed, the property information corresponding to the designated property information name is erased. On the other hand, if a "Save file" button 1706 is pressed, the property information selected in the property information selection box 1701 is output as an external file. If a "Read file" button 1705 is pressed, an external file selection box (not shown) appears for selecting an external file in which printing parameters are described. If an external file is read, property information including the parameters described in the external file is added.

Figure 18:
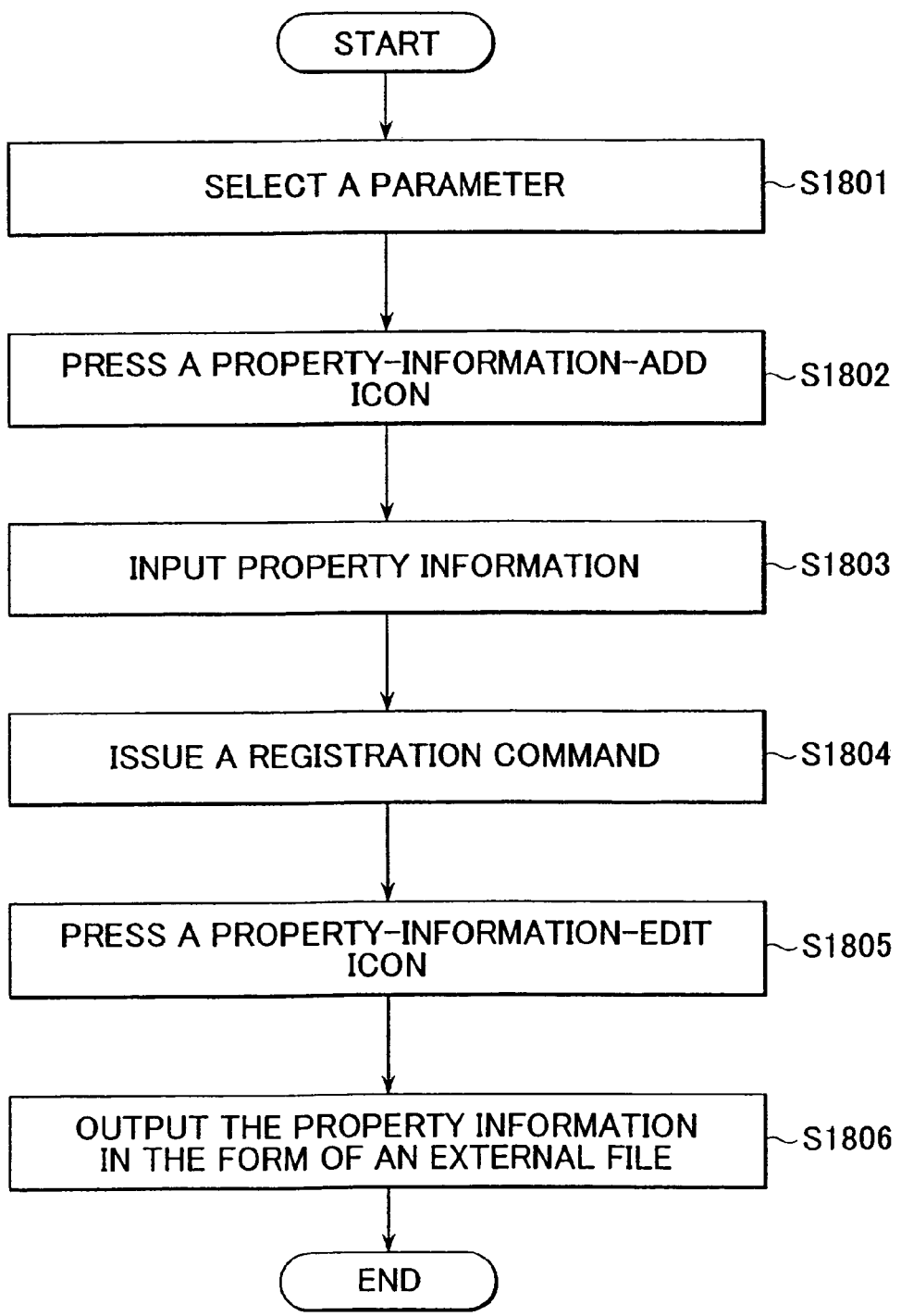
FIG. 18 is a flow chart of a process performed by a human manager to register property information at an installation server device.

FIG. 18 illustrates an example of a process performed by a human manager to register property information at an installation server device. Referring to FIG. 18, the process is described below. The human manager selects a parameter associated with a printing process via the screen shown in FIG. 14 (step S1801). If the property information addition button 1403 is pressed (step S1802), the screen shown in FIG. 15 appears. In the screen shown in FIG. 15, a property information name is input in the box 1051, an icon is selected in the box 1052, a comment is inputted in the box 1053 (step S1803). Thereafter, if the "OK" button 1507 is pressed (step S1804), the property information is registered in the driver (and the screen shown in FIG. 14 again appears). If the "Property information edit" button 1404 is pressed in the screen shown in FIG. 14 (step S1805), the screen shown in FIG. 17 appears. In this screen shown in FIG. 17, if the human manager presses the "Save file" button 1706, the driver outputs the property information as an external file to a specified directory. Hereinafter, the externally outputted file, in which the property information is described, will be referred to as the external file. The human manager creates one or more pieces of property information for each client or for each of different printers at each client and stores one or more files in which the property information is described in a specified directory. Preferably, each external file is assigned a name related to a corresponding client device name or a printer name. An external file may be transmitted to another information processing device and property information described in the external file may be written into a driver of that information processing device or registered in an OS thereof.

Figure 5:
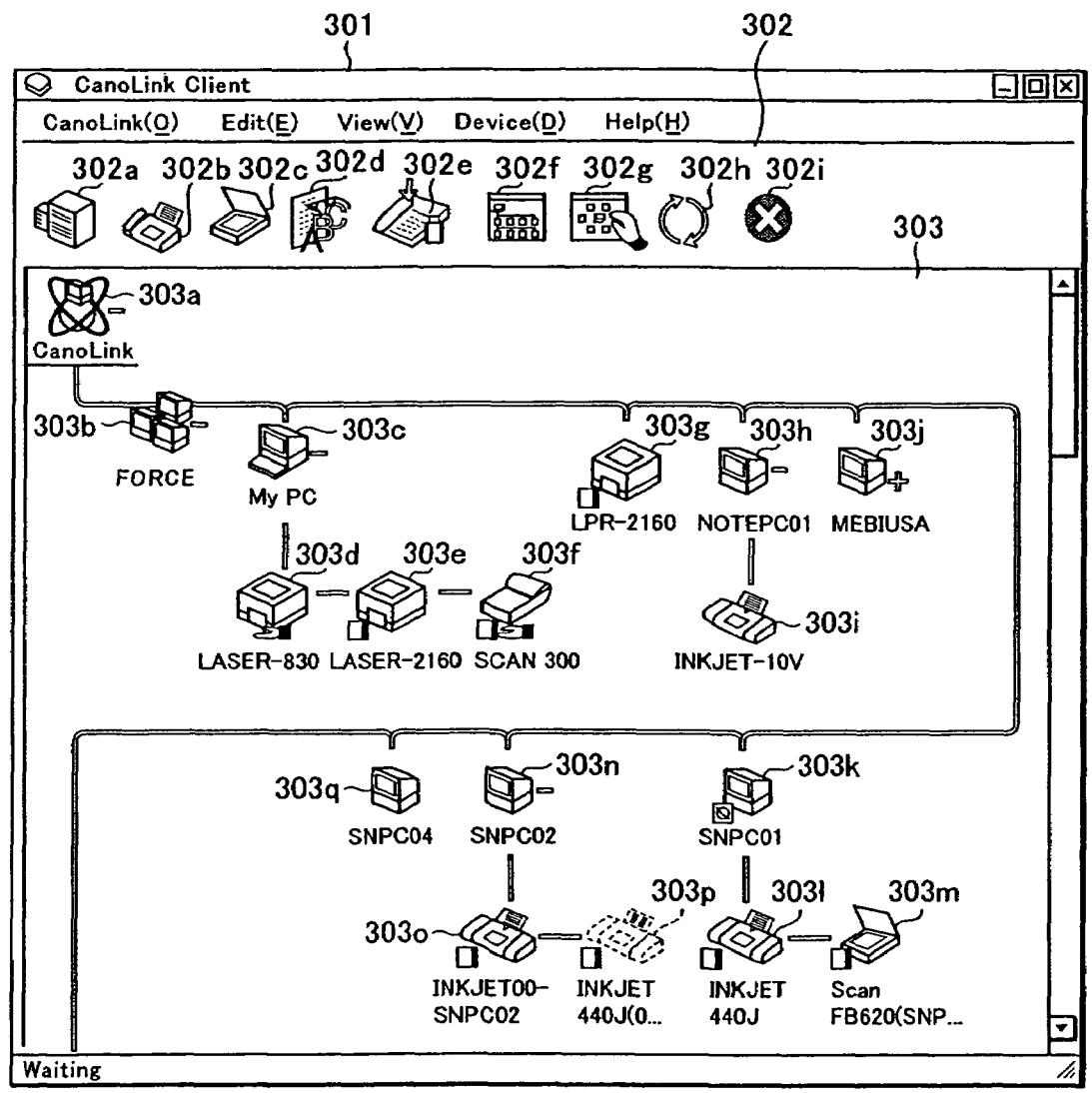
FIG. 5 is a diagram illustrating an example of a screen on which icons indicating PCs and peripheral devices on a network are displayed.

FIG. 5 illustrates an example of a screen on which information about PCs and peripheral devices on the network is displayed. In FIG. 5, a reference numeral 301 denotes a menu. Reference numeral 302 denotes a tool bar. Reference numeral 303 denotes a main window in which icons corresponding to the respective PCs and peripheral devices are displayed. Reference numerals 302*a* to 302*i* denote icons, disposed in the tool bar 302, for designating various functions associated with the PCs or the peripheral devices. For example, an icon 302*a* is a "Copy" icon used to read image data using a selected scanner and output the read image data to a selected printer. An icon 302*b* is a "Fax" icon. An icon 302*c* is a "Scan" icon. An icon 302*d* is used to scan image data and perform optical character recognition on the image data. An icon 302*e* is used to manage facsimile transmission/reception data. An icon 302*f* is used to switch the screen being displayed. An icon 302*g* is used to edit a screen. An icon 302*h* is used to update information. An icon 302*i* is used to cancel the updating process.

Reference numerals 303*a* to 303*q* denote icons indicating PCs or peripheral devices shared on the network. These icons 303*a* to 303*q* are displayed so as to indicate the types of devices such as a PC, a printer, a scanner, and a facsimile modem and so as to indicate the status, such as "in progress" or "occurrence of an error". Of these icons, an icon 303*c* indicates the present PC itself, and an icon 303*b* indicates a domain to which the present PC is currently logging on. Because the present PC is a special device, the icon thereof is displayed at the beginning so as to distinguish it from the other PCs. Icons of PCs other than the present PC are displayed in ascending or descending alphabetic order.

For PCs or peripheral devices which are shared on the network but the drivers of which are not installed, icons are displayed in gray, as is the case with an icon 303*p*. In the case where a device has one or more connected devices that are not expanded in indication on the screen, an icon thereof is accompanied by a mark "+" as is the case with an icon 303*j*. When a device has one or more connected devices that are expanded in indication on the screen, an icon thereof is accompanied by a mark "−" as is the case with icons 303*h*, 303*k*, and 303*n*. In the case where a device has no connected device, an icon thereof is accompanied by no mark as is the case with an icon 303*q*.

Thus, the icons displayed on the screen allow it to recognize the status such as a connection status of all PCs and peripheral devices on the network. In this specific example, all icons are not displayed on the screen because of the limited size of the screen. However, the remaining icons of the other PCs and peripheral devices can be displayed by means of scrolling using a scroll bar disposed on a side of the screen.

Figure 6:
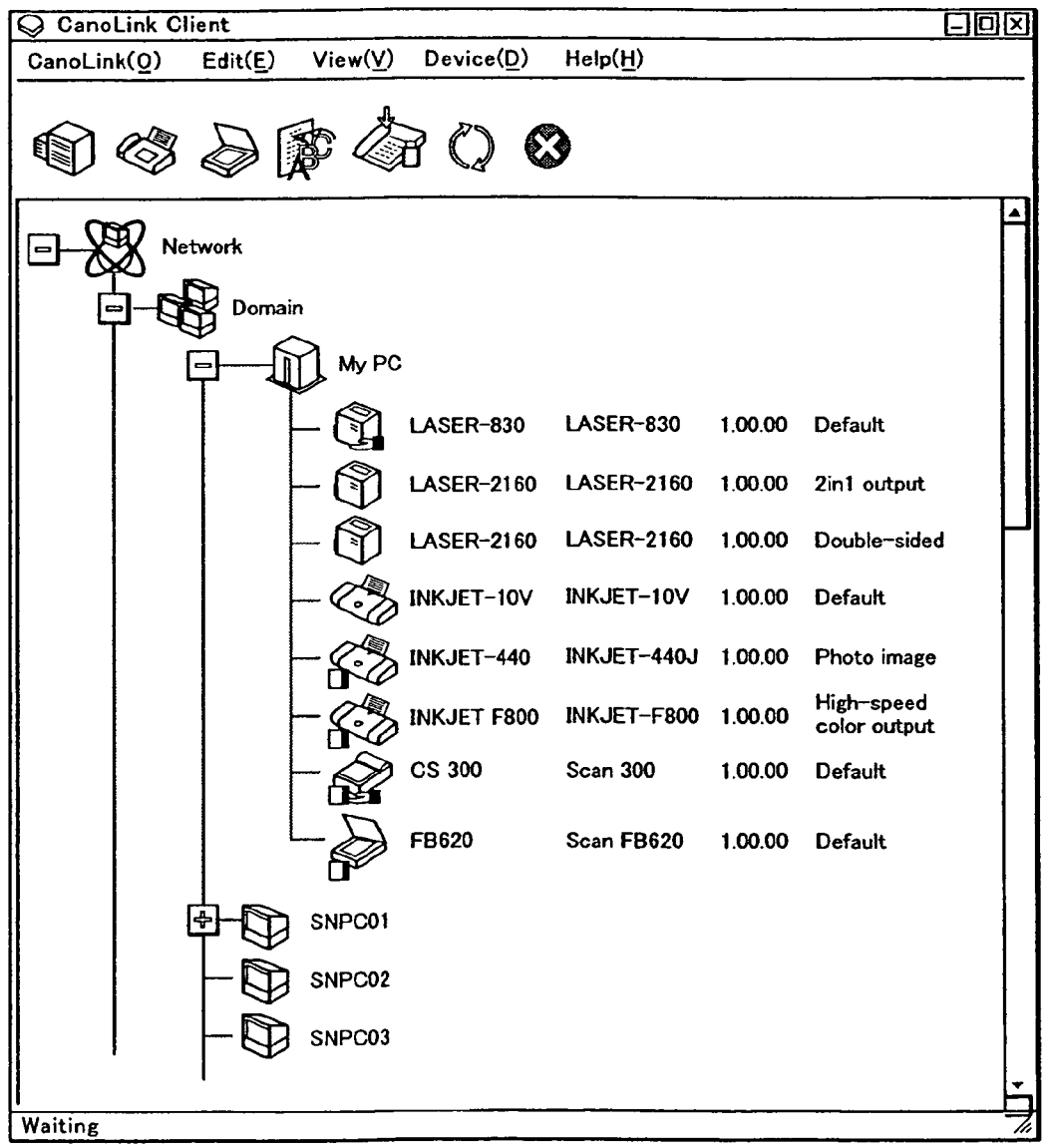
FIG. 6 is a diagram illustrating an example of a screen on which status in terms of setup of drivers of respective PCs on a network is displayed.

FIG. 6 illustrates an example of a screen on which the driver setup status of each PC on the network is displayed in accordance with information described in a driver information structure acquired from each PC. In this example shown in FIG. 6, six printer drivers and two scanner drivers are installed in "My PC". From the indication displayed on the screen, it can be seen that, for example, a printer "INKJET-10V" is shared under a name of "INKJET-10V" and has a driver with a driver name of "INKJET-10V", a version number of "1.00.00", and "default" property information.

Referring again to the flow chart shown in FIG. 2, in step S204, a setup program including an installer in the server device determines whether a request for property information has been issued. If no property information is requested, the process is ended. However, if the setup program in the server device determines that property information is requested, the process proceeds to step S205. A request for property information may be issued, for example, by selecting property information of a driver from a menu by operating a mouse at a PC and requesting a server to transmit the selected property information.

In the next step S205, the setup program in the server device determines whether the requested property information of the driver exists. If there is no property information, the setup program in the server device returns a message indicating that the requested property information does not exit, and the process is ended. If the requested property information exists, the setup program in the server device proceeds to step S206. Supported functions of the same device can vary depending upon a version. Therefore, the determination of whether property information of the device is available is made in accordance with the device type, the driver name, and the version. When all these items are consistent, it is determined that property information is available.

In step S206, a property information list is transmitted to a PC that has issued the request. Instead of transmitting all information to the PC that has issued the request, only minimum information required for a user to make a selection may be transmitted, thereby reducing network traffic.

In step S207, the setup program in the server device determines whether a property information request has been received from that PC. If no request is received, the process is ended. However, if a request has been received, the process proceeds to step S208. In step S208, the setup program in the server device requests the OS of the server device to transmit the requested property information of the driver, and the process is ended.

Figure 7:
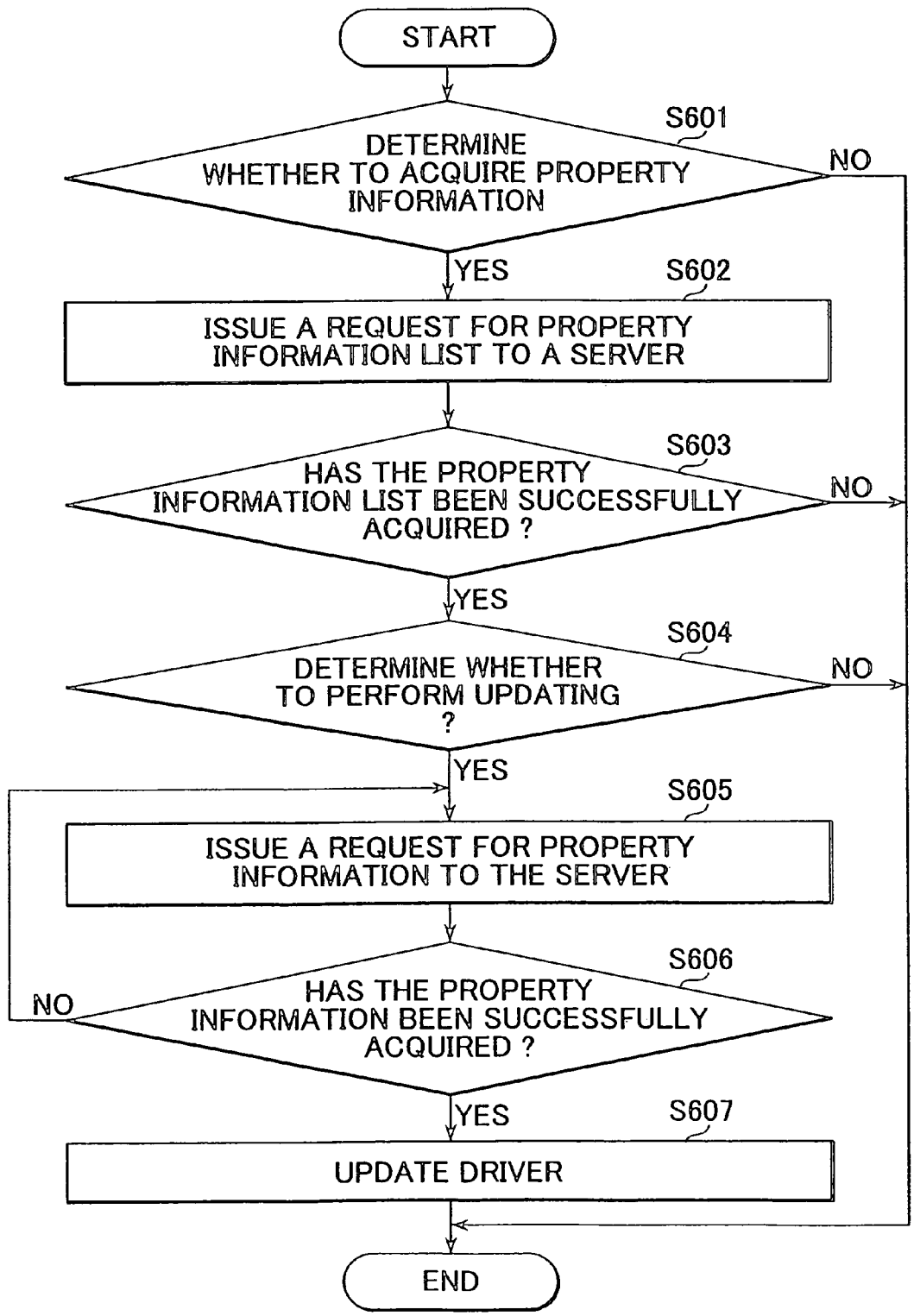
FIG. 7 is a flow chart of a process performed by a PC functioning as a client device.

FIG. 7 is a flow chart of a process performed by a PC that operates as a client device. In step S601, it is determined whether to acquire property information of a driver from the server device. If acquisition of property information is not needed, the process is ended.

In the case where property information is needed, the setup program in the server device proceeds to step S602 to issue a request for property information list to the server device. When the request is transmitted, information about the device type, the driver name, and the version is transmitted together with the request.

In step S603, the setup program in the server device determines whether the property information list of the driver has been acquired. If the property information list cannot be acquired because the server device does not have the property information of the driver or for any other reason, the process is ended.

In the case where the property information list has been acquired, the process proceeds to step S604 to determine whether to acquire property information. If it is determined that acquisition of property information is not performed, the process is ended.

In the case where it is determined that property information should be acquired, the process proceeds to step S605. In step S605, a property information acquisition request is transmitted to the server device. In step S606, it is determined whether the property information has been acquired. If the property information has not acquired yet, the process returns to step S605 and waits until the property information has been acquired.

If the property information has been acquired, the process proceeds to step S607 to update the driver in accordance with the acquired property information.

In the flow charts shown in FIGS. 2 and 7, the property information of all drivers is managed in a centralized fashion by the server device. In this case, a large amount of information is transmitted over the network. To prevent a problem due to high traffic, property information itself may be stored in each PC and managed by each PC, and only minimum information may be stored in the server device. In this case, when property information becomes necessary, property information is transmitted to a specified PC in response to a request from the server device.

Figure 8:
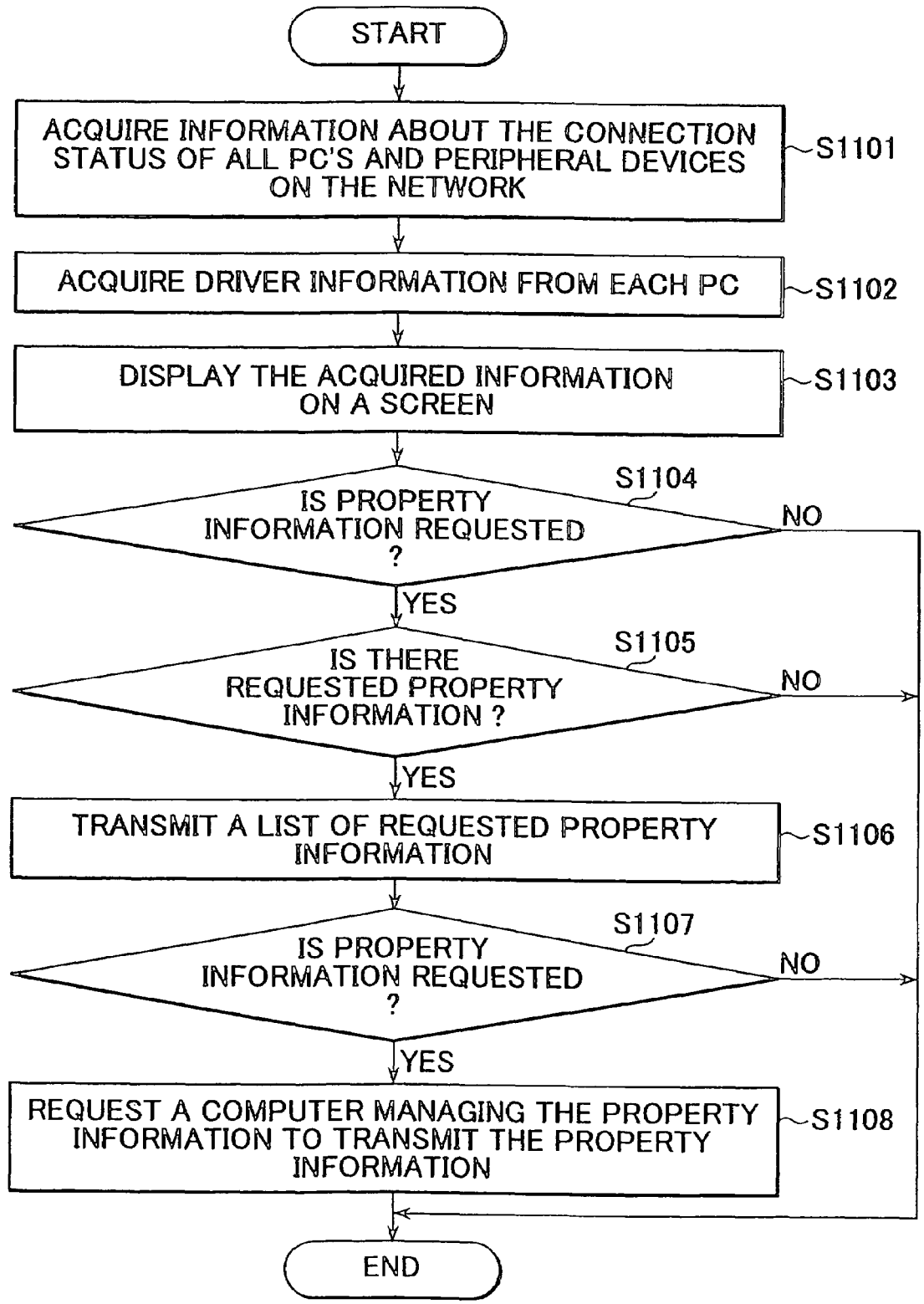
FIG. 8 is a flow chart of a process performed by a server device.
Figure 9:
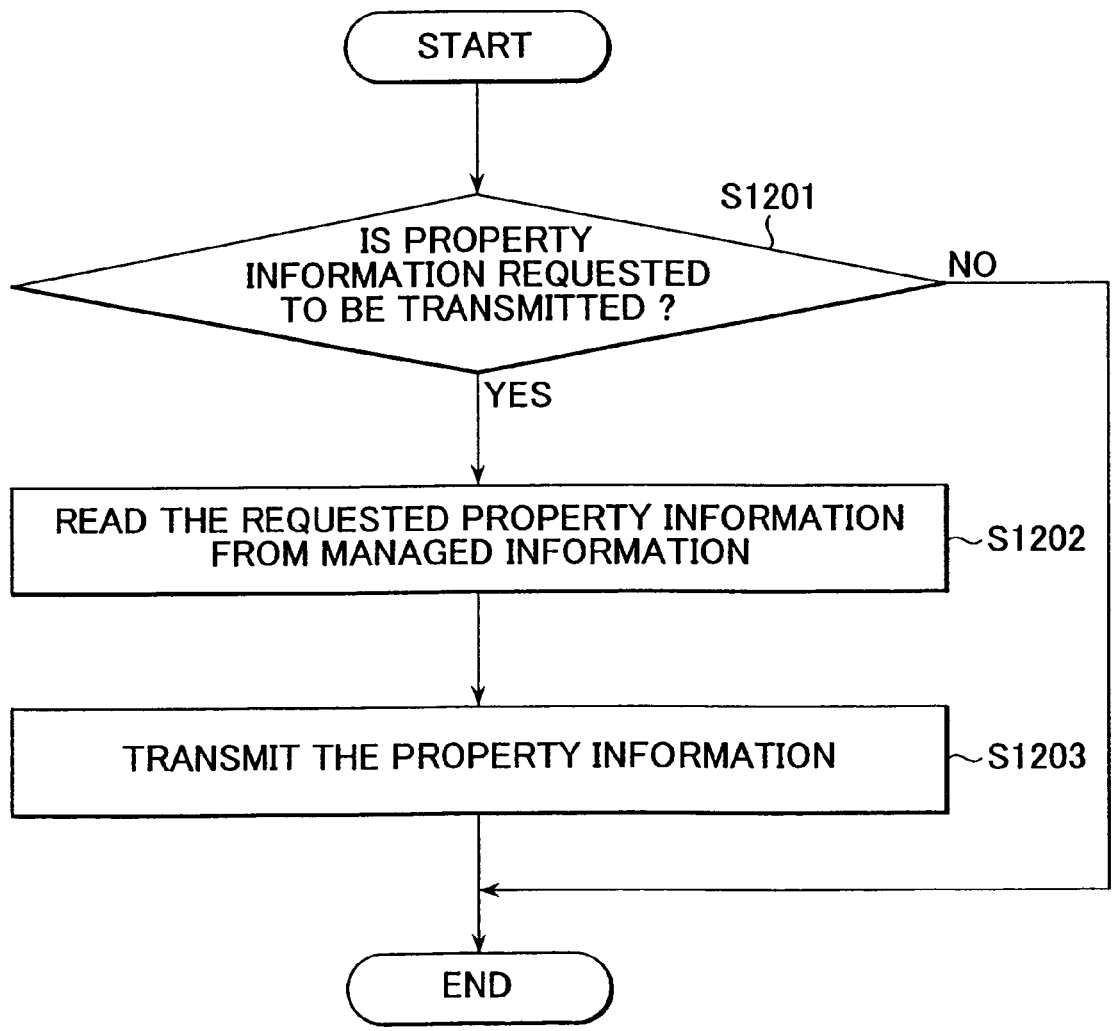
FIG. 9 is a flow chart of a process performed by a client device.

FIG. 8 illustrates a flow chart of a process performed by the server device for the case where property information of drivers installed in each client device is managed by the client device. FIG. 9 is a flow chart of a process performed by the client device. Steps S1101 to S1107 in FIG. 8 are similar to steps S201 to S207 in the flow chart shown in FIG. 2.

In step S1108, a property information transmission request together with data indicating a device type, a driver name, a version, property information, and a PC to which property information is to be transmitted is transmitted to a PC that manages property information of a driver.

In the client device, on the other hand, in step S1201 in the flow chart shown in FIG. 9, it is determined whether a request for transmission of property information is received from the server device. If no request is received, the process is ended.

However, if a request has been received, the process proceeds to step S1202 to read property information of a specified driver from the management data. The structure of the management data may be similar to that shown in FIG. 3. In step S1203, the property information is transmitted to the specified PC.

In the example described above, the property information is transmitted in response to a request issued by a client device. Instead, property information may be transmitted by a client device in response to a command issued by the server device. In this case, processes are performed by the server device and the client device as shown in flow charts shown in FIGS. 10 and 11, respectively.

Figure 10:
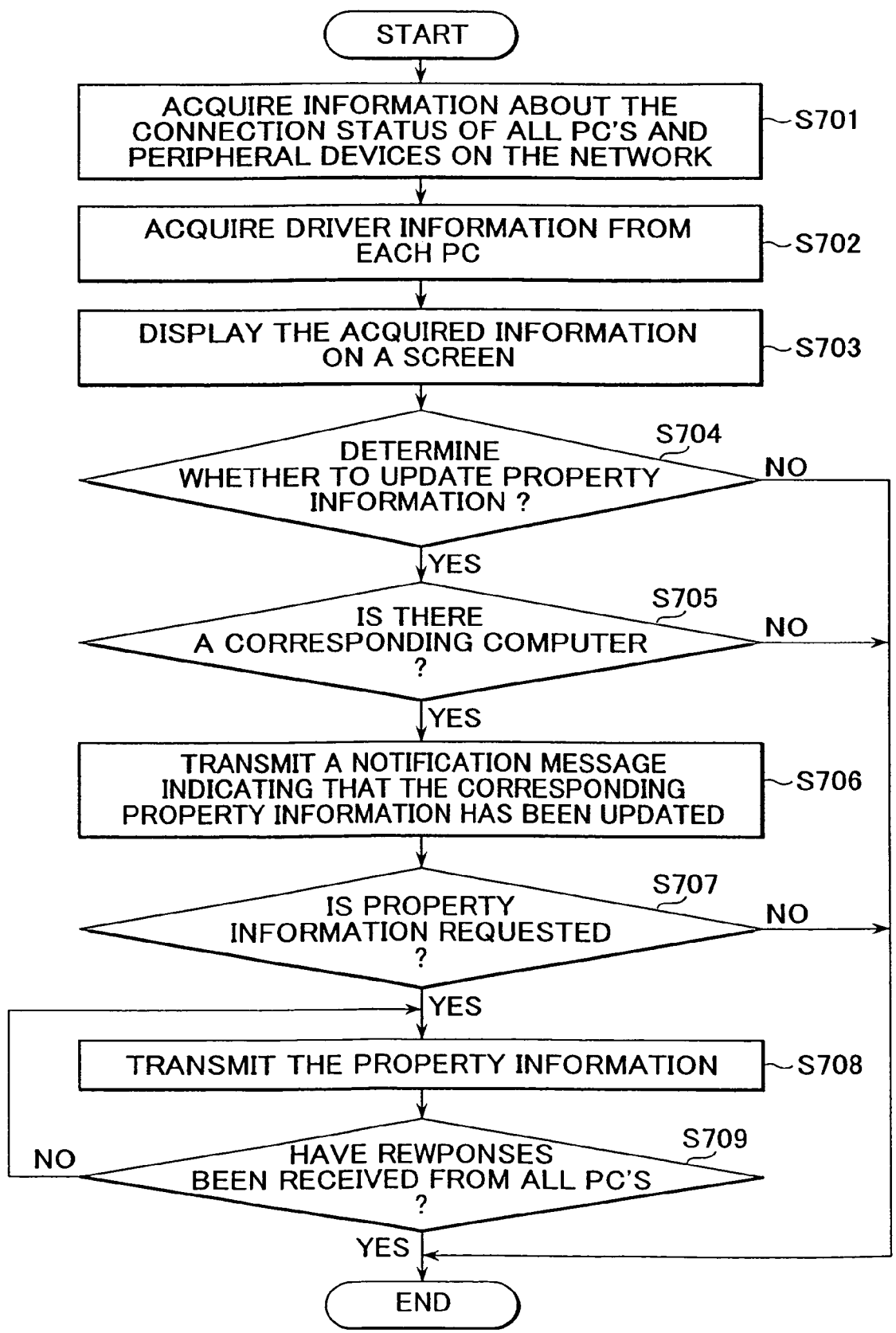
FIG. 10 is a flow chart of a process performed by a server device.

That is, FIG. 10 is a flow chart illustrating the process performed by the server device. Steps S701 to S703 in this flow chart are similar to steps S201 to S203 in the flow chart shown in FIG. 2.

Figure 12:
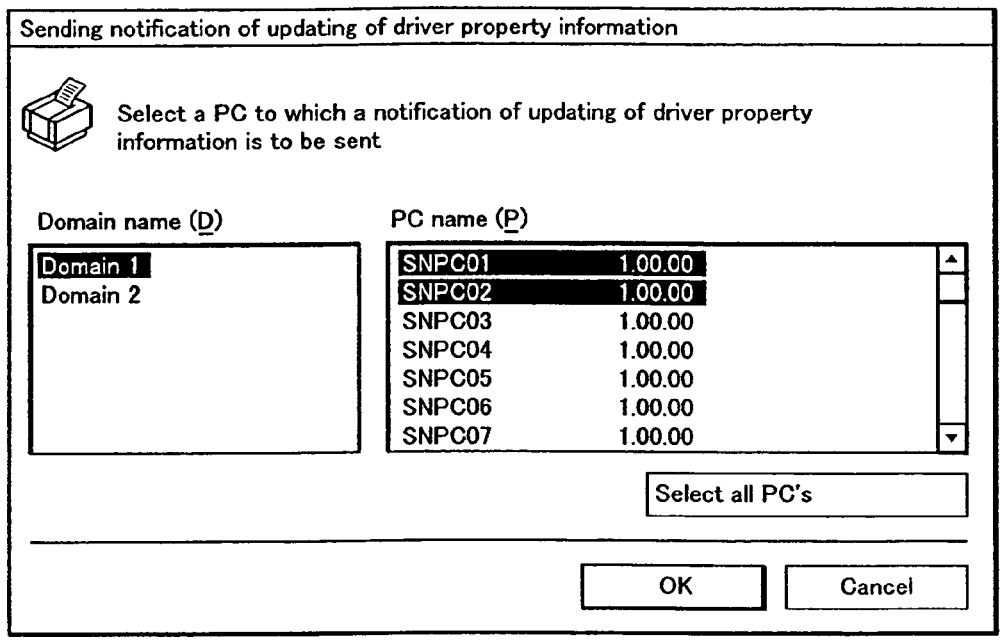
FIG. 12 is a diagram illustrating an example of a screen for selecting a PC to be updated in terms of property information.

In step S704, a setup module in the client device determines whether property information stored in the client device should be updated. If an update command is not issued, the process is ended. On the other hand, if an update command is issued, the process proceeds to step S705. More specifically, for example, a driver is first selected and then a command is issued to update/set-up the property information of the selected driver. It is preferable that the update/setup command be issued by means of a remote procedure call (RPC) or SOAP (Simple Object Access Protocol) that is an implementation of the remote procedure call described in XML in an objected-oriented fashion. More specifically, for example, an update module installed in a client device is remotely called by means of RPC in response to an update command issued by the server device. In step S705, on the basis of the information acquired in step S702, it is determined whether there is a client device in which the specified driver is installed. If no such client device is found because the power of a PC is in an off-state or the driver has been deleted or for any other reason, the process is ended. If one or more PCs having the specified driver are found, a list of PCs is displayed. FIG. 12 illustrates an example of a screen on which the list of PCs having the specified driver is displayed. In this screen, a PC to be updated in terms of property information is selected.

In step S706, the setup module in the client device controls the OS to transmit a property information update notification to the selected PC. In step S707, the setup module in the client device determines whether a request for transmission of property information is received from some client device. If no transmission request is received, the process proceeds to step S709. In the case where a transmission request is received, the process proceeds to step S708. In step S708, the setup module in the client device issues a command to the OS to transmit the specified property information to the PC that has issued the request. Herein, the property information is described in a file in a predetermined format. At the client PC in which the driver is installed, a user thereof can input or output the property information by issuing a command to the driver.

In step S709, the setup module in the client device determines whether responses have been received from all PCs to which the update notification was transmitted. If it is determined that responses have been received from all PCs, the process is ended. However, if a response has not been received from all PCs, the process returns to step S708 to continue the process.

Figure 11:
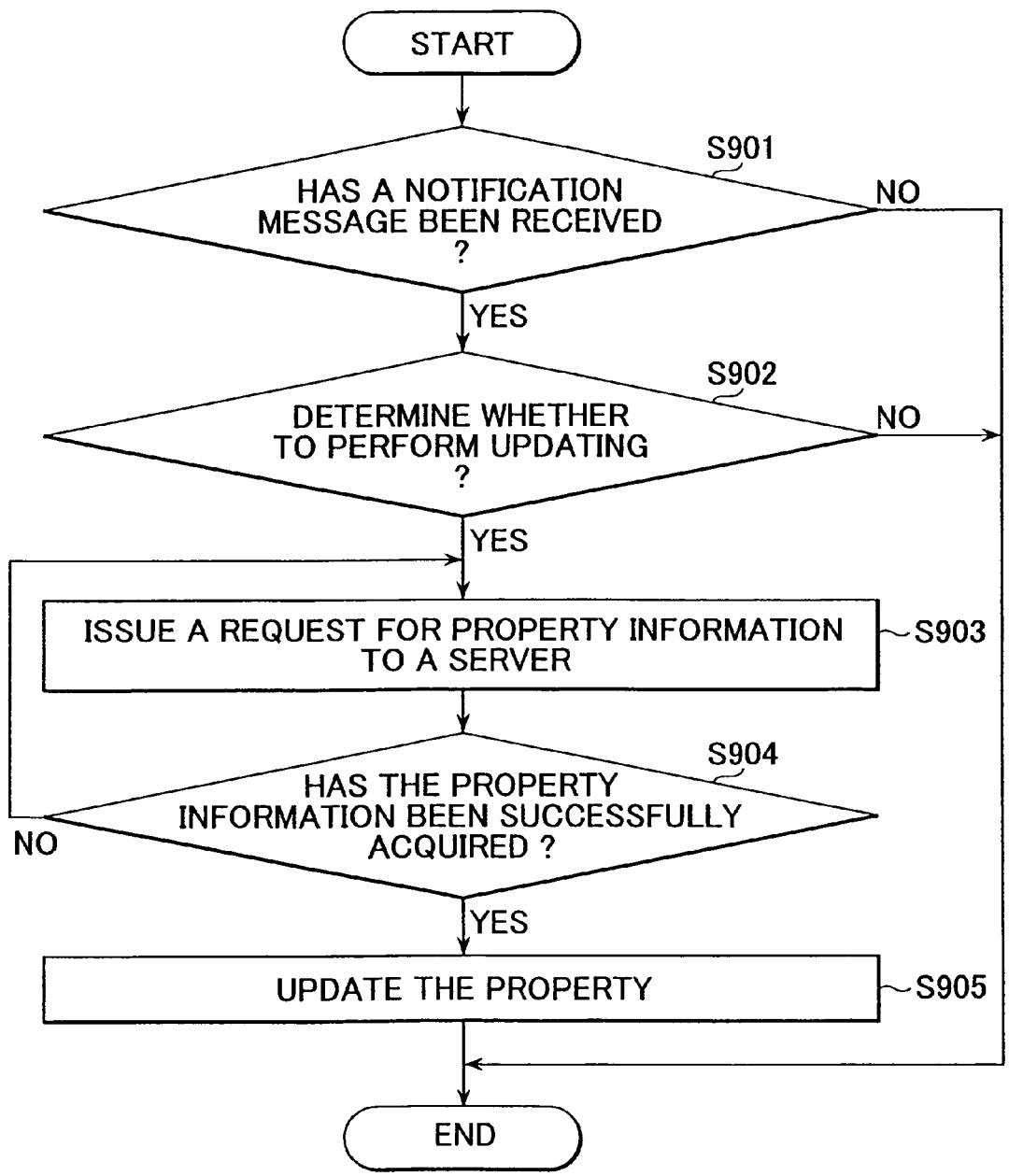
FIG. 11 is a flow chart of a process performed by a client device.

FIG. 11 is a flow chart of a process performed by a client device. First, in step S901, it is determined whether a property information update notification has been received from the server device. If no such notification is received, the process is ended.

If a notification has been received, the process proceeds to step S902 to determine whether the property information should be updated.

Figure 13:
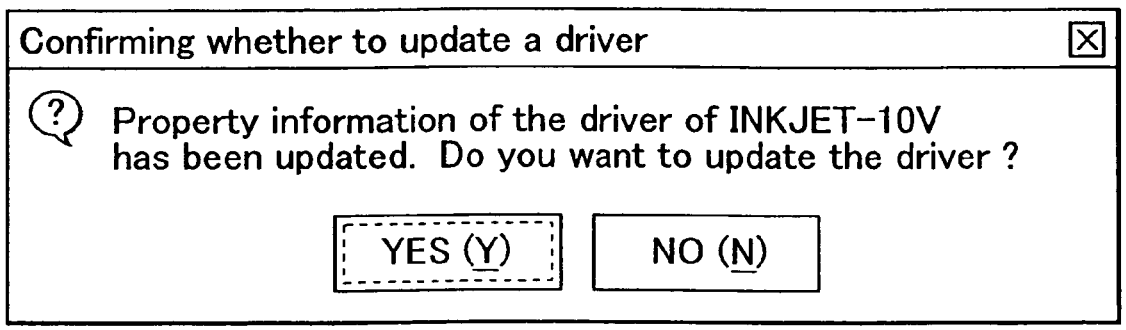
FIG. 13 is a diagram illustrating an example of a screen that is displayed when a property information update notification is received.

FIG. 13 illustrates an example of a message that is displayed when the notification is received. If a "No" button is clicked, a message, indicating that updating of the property information is not performed, to the server device, and the process is ended. On the other hand, if a "Yes" button is clicked to update the property information, the process proceeds to step S903. In step S903, a request for transmission of the property information is transmitted to the server. Thereafter, the process proceeds to step S904.

In step S904, the setup module in the client device determines whether the property information and the setup information have been acquired from the server device. If they have not been acquired yet, the process returns to step S903 and waits until they have been acquired. If the property information and the setup information have been acquired, the process proceeds to step S905. In step S905, on the basis of the acquired information, the property information of the specified driver is updated in accordance with a setup instruction described in the setup information.

Herein, in accordance with the setup instruction, the setup module in the client device calls an API of the OS in the client device thereby registering the received property information in a registry area of the OS. The setup instruction may issue a command to control the driver setup module so as to read the property information into the driver.

In the present example, the confirmation message is displayed in step S902. Alternatively, the updating process may be immediately performed without displaying the message.

In the present embodiment, as described above, icons indicating PCs and peripheral devices shared on the network are displayed in a window, and property information associated with drivers of the peripheral devices is shared on the network, and thus the property information of the drivers can be updated via a simple operation. Furthermore, it is possible for the server device to set property information that is common for all client devices. The management of property information may be performed in a distributed fashion by client devices. In this case, minimum information may be transmitted, and thus traffic over the network can be minimized.

Instead of setting or updating property information in the above-described manner, setting or updating of property information may be performed in a different manner. That is, in an embodiment described below, when a driver is installed or updated in a client device, the driver is transmitted from the server device to the client device without waiting for a request from the client device, as described below.

Figure 20:
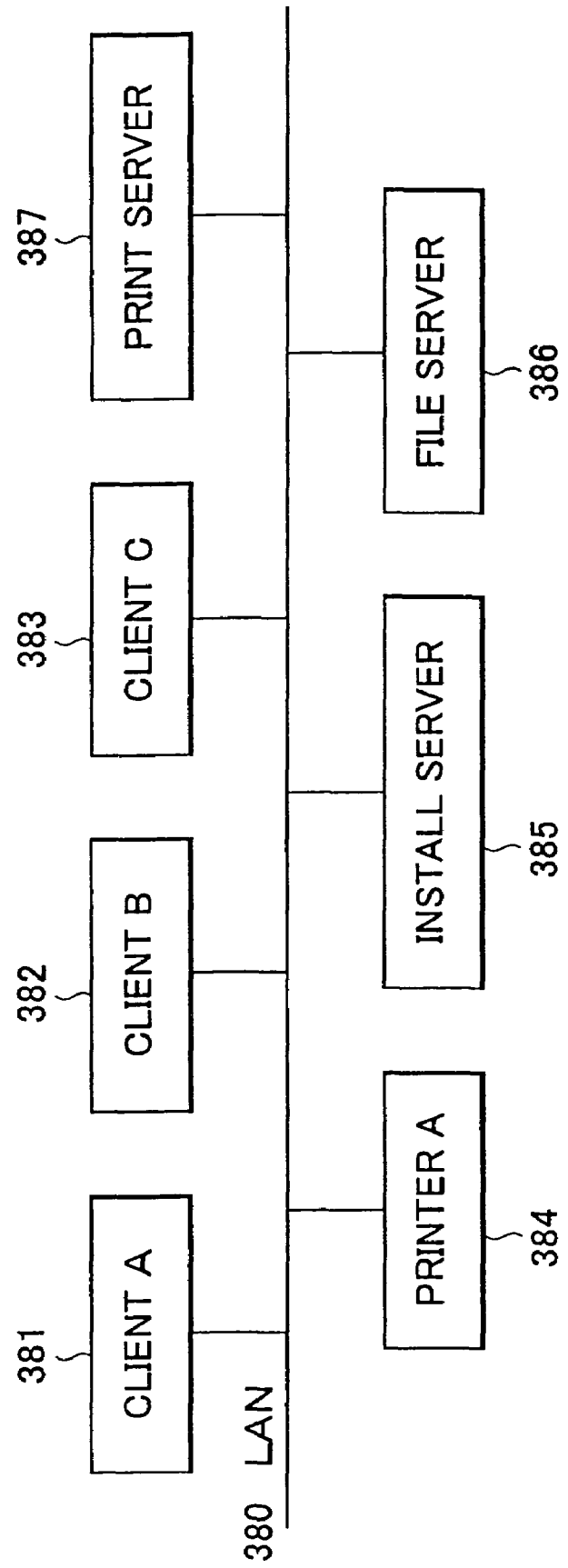
FIG. 20 is a block diagram illustrating an example of a printing system according to an embodiment of the present invention.

FIG. 20 illustrates an example of a printing system according to the present embodiment of the invention. The printing system includes, as client devices, a client device A denoted by reference numeral 381, a client device B denoted by reference numeral 382, and a client device C denoted by reference numeral 383. The printing system also includes, as server device, an installation server device 385, and a web server device 386. Those devices are connected to each other via a network such as a LAN (Local Area Network) 360. In the present embodiment, the installation server device 385, the web server device 386, and the client devices 381 to 383 are each realized by a PC having an internal structure similar to that shown in FIG. 1.

Figure 23:
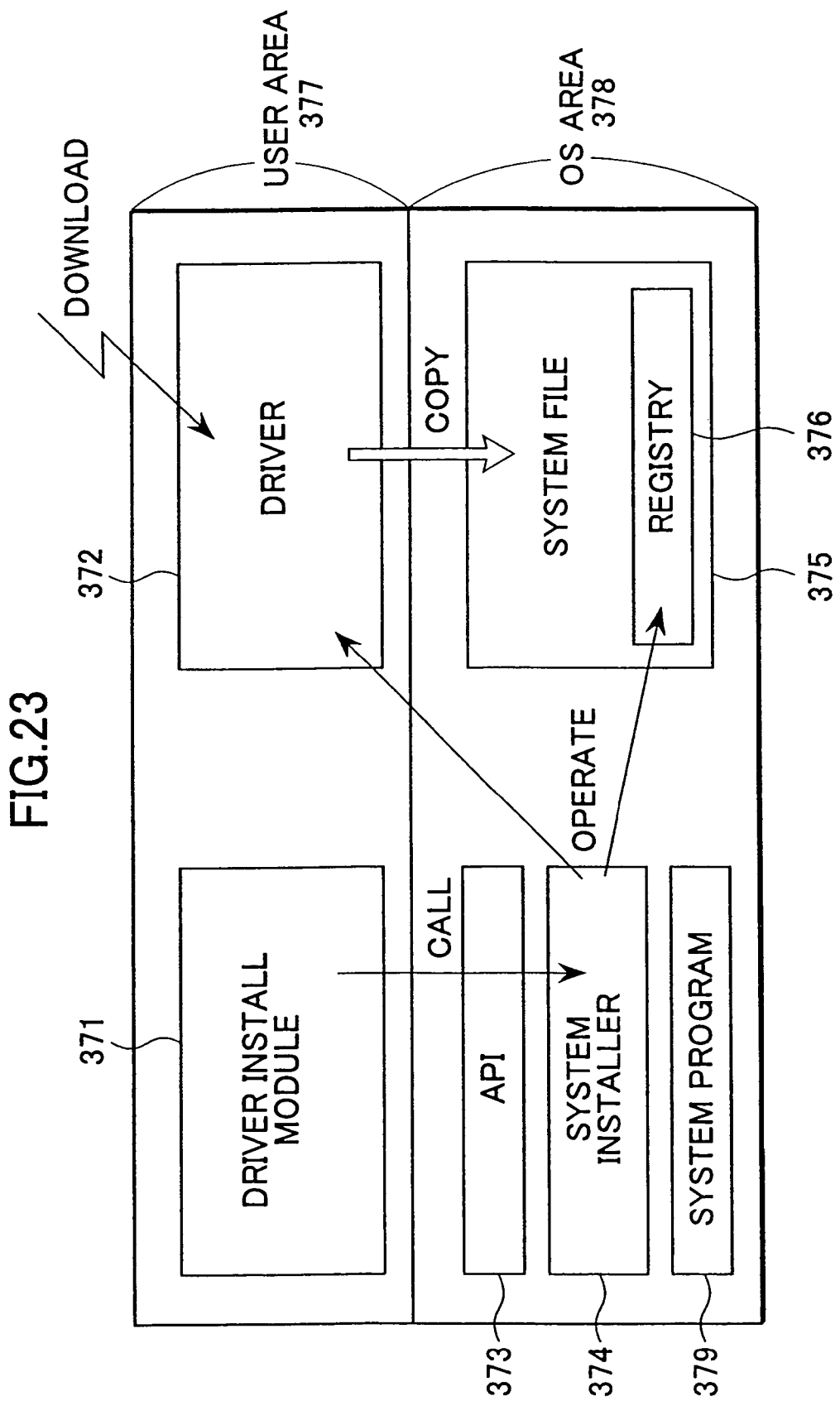
FIG. 23 is a diagram illustrating a preferable example of a set of software modules of a client device.

FIG. 23 illustrates an example of a set of software modules disposed in each client device. A setup program in the installation server device 385 shown in FIG. 20 calls an API or a system call of an OS to transmit a driver setup command and a driver itself, without waiting for a driver information transmission request from a client device. Furthermore, the setup program controls the OS to transmit driver property information to the client device from the installation server autonomously or in response to a request issued by the client after the driver was installed.

Referring to FIG. 23 illustrating the software module structure of a client device, an example of a process of installing a driver in the client device is described. The client device has an OS installed therein. In each client device, the software module structure includes a user area 371 and an OS area 377. A driver installation module 371 is an application that operates under the control of the OS. A system program 379 registers, in the registry 376, the driver name and the printer name stored in the client device, and also the directory in the system, thereby managing them.

A driver installation module 371 calls a system installer 374 via an API (Application Program Interface). The system installer 374 is provided as one function of the OS. In response to a command issued by the driver installation module 371, the system installer 374 copies or moves a driver 372 stored in the user area 376 into a system file area 375. A part of the system file area 375 is used as a registry area 376 for storing various kinds of information associated with devices using drivers. The driver installation module 371 may call the system installer 374 to store driver setup information and property information into the registry area. A registry may be provided for each user.

In accordance with a setup command received from an external device, the driver installation module 371 calls an API of the OS to register property information in the registry 376 or calls a driver installed in the system file to read property information. A favorite printing setting for each printer registered in the OS of the client device may be stored as property information in the registry area of the OS.

It may also be possible to receive, from the installation server device, an external file in which property information of a driver is described in the format described above with reference to FIG. 14, and store the property information into a file system in the user area 376. In this case, the driver installer may automatically read the driver property information described in a file and may transfer it to a driver so that the driver property information is reflected in the driver setting.

Figure 19:
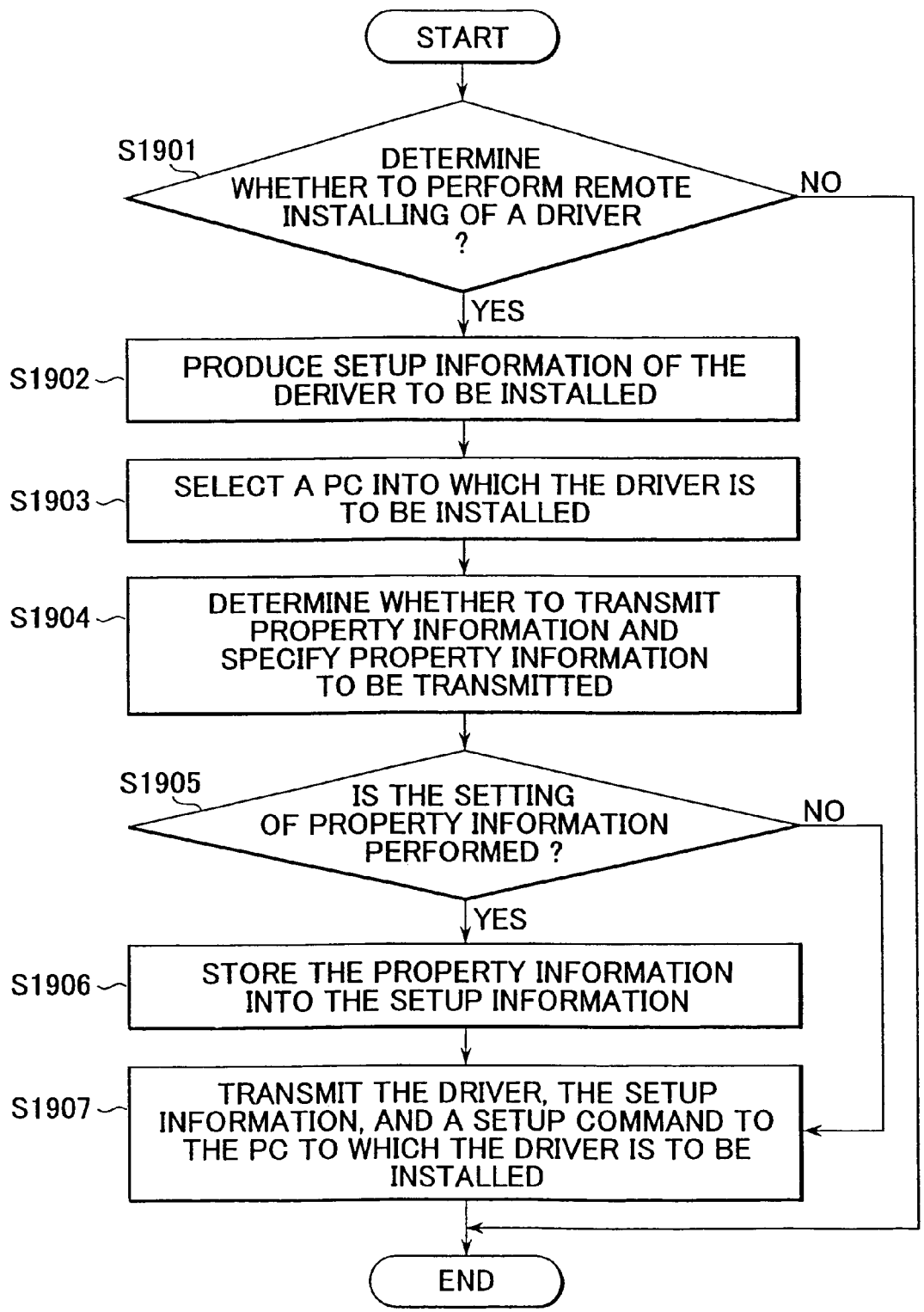
FIG. 19 is a flow chart illustrating an example of a process performed by an installation server device to transmit a driver to a client device and set up the property information.

FIG. 19 is a flow chart illustrating an example of a process performed by the installation server device to transmit a driver to a client device and set property information thereof. In the present embodiment, property information of a driver is inputted by a human manager into the installation server device and outputted as an external file from the installation server device, as described earlier with reference to FIG. 14. This process is started when a setup program having a remote installation function in the installation server device 385 is activated. In the process shown in FIG. 19, the setup program in the installation server device 385 transmits a driver in a push installation fashion, without waiting for a request from a client device. The setup program (management means) in the installation server device 385 manages property information for each printer registered in the OS. The setup program may transmit property information by controlling the OS such that property information adapted to functions or options of each printer is transmitted.

If the OS of each client device receives a driver and setup information from the installation server device via the network, the OS transmits the property information of the driver and a property information setup command to the driver installer (input means). In accordance with the setup command, the installer installs the property information into the OS of the installation server device 385 so that the driver in the installation server device 385 can recognize the property information. More specifically, for example, in response to the setup command, the driver installer inputs the property information received from the OS into the driver so that the driver recognizes the property information. Furthermore, in response to the setup command, the driver installer calls an API of the OS to register the property information in the registry of the OS so that the driver can recognize the property information via the OS.

The operation of the installer in the installation server 385 is described below. In the following description, the client device A, the client device B, and the client device C are generically denoted by a client device.

Referring again to FIG. 19, in step S1901, the setup module in the installation server device 385 determines whether a remote installation command to install a driver in a client device has been issued. The remote installation command is issued, for example, when a setup command is input to the input controller 11 via a graphical user interface displayed on the CRT 16 in response to an operation of the mouser 13 or the keyboard 12 performed by an user. In the case where the setup program in the installation server device 385 determines that no remote installation command is issued, the process is ended. On the other hand, if the setup program in the installation server device 385 determines, in step S1901, that the remote installation command has been issued, the setup program proceeds to step S1902 to generate setup information of a driver to be remote-installed. The setup information of the driver includes the driver name of the driver to be installed, the driver itself, the printer name, the output port name, and a module for using the port. The printer name is registered in the registry or the like of the OS of the client device and is managed by the OS.

Figure 21:
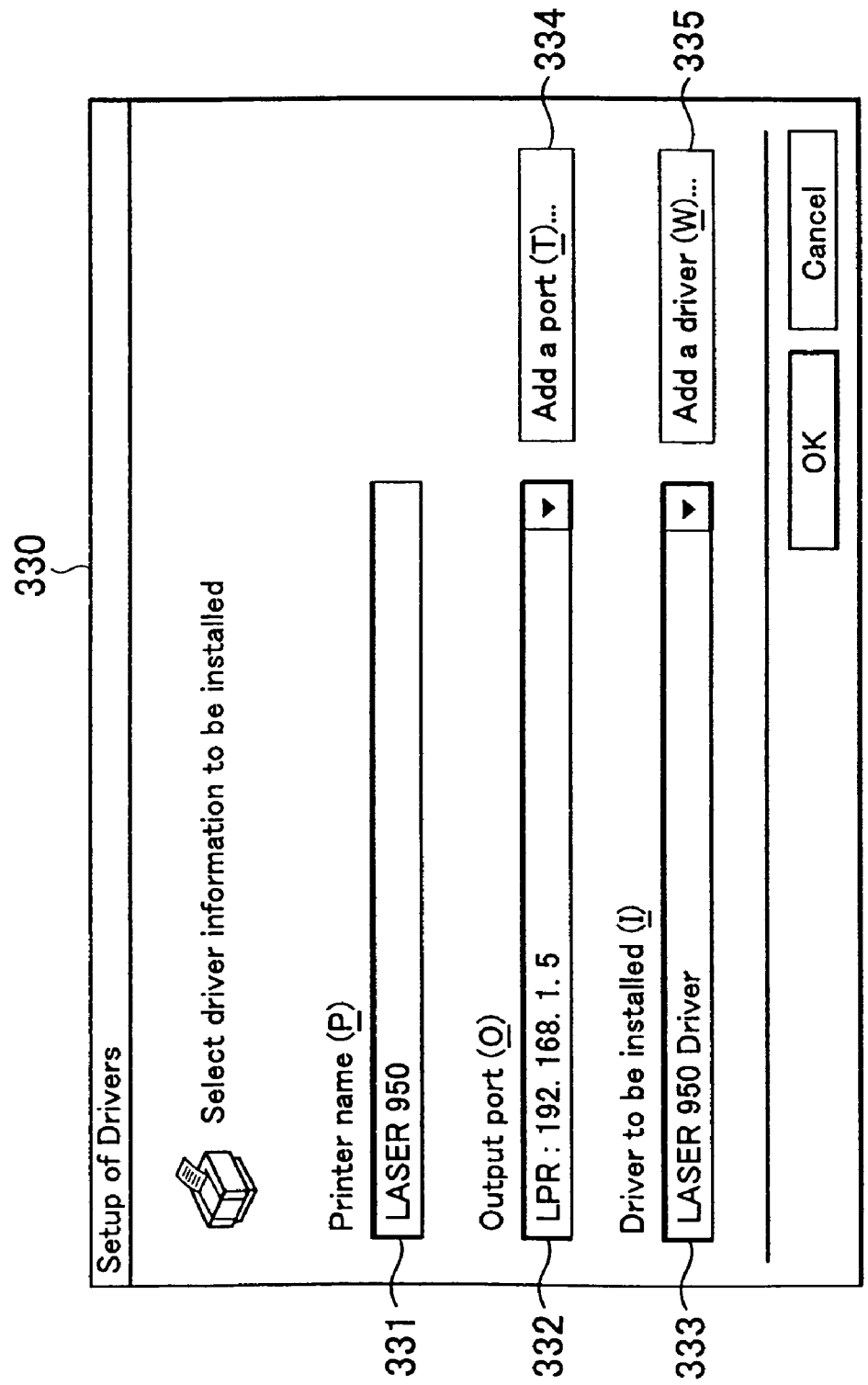
FIG. 21 is a diagram illustrating an example of a screen, displayed on a CRT of an installation server device, for setting driver information.

Step 1902 is described in further detail below with reference to FIG. 21 illustrating a driver information setting screen displayed on the CRT of the installation server device. A human manager creates setup information including a setup command via this setting screen. In FIG. 21, reference numeral 331 denotes a printer name input box for inputting or selecting a printer name to be registered in the client device. In the printer name input box 331, a plurality of printers retrieved on the network may be displayed for the purpose of selection. Reference numeral 332 denotes a port designation box. A port can be added into the port designation box 332 by clicking an "ADD a port" button 334 with a mouse. In the example shown in FIG. 21, an IP address indicating the location of the printer on the network is designated in the port designation box 332, wherein Ipr is designated as the printing protocol, and a logical port is created in accordance with the designation. Ipr is a conventional print management program. Instead of Ipr, another print management program may also be employed. Furthermore, instead of TCP/IP, another network protocol may also be employed. Reference numeral 333 denotes a driver designation box for designating a driver to be installed in the client device. A driver can be designated by clicking an "Add a driver" button 335. In this example, a port is created so that a network printer can be controlled using TCP/IP and Ipr. A port may also be created for a local printer. For example, when setting is performed for a local printer of a client device, a COM port or a LPD port is designated, and setup information is created on the basis of the designation. A port may also be set so that printing can be performed via a print server. For example, in the case where a printer server 387 has a printer server name "SVPC1" and a printer 384 has a printer name "LASER950", if a port is designated as "\\SVPC1\LASER950", the port is set so that the printer "LASER950" of the print server "SVPC1" is used for printing.

Figure 22:
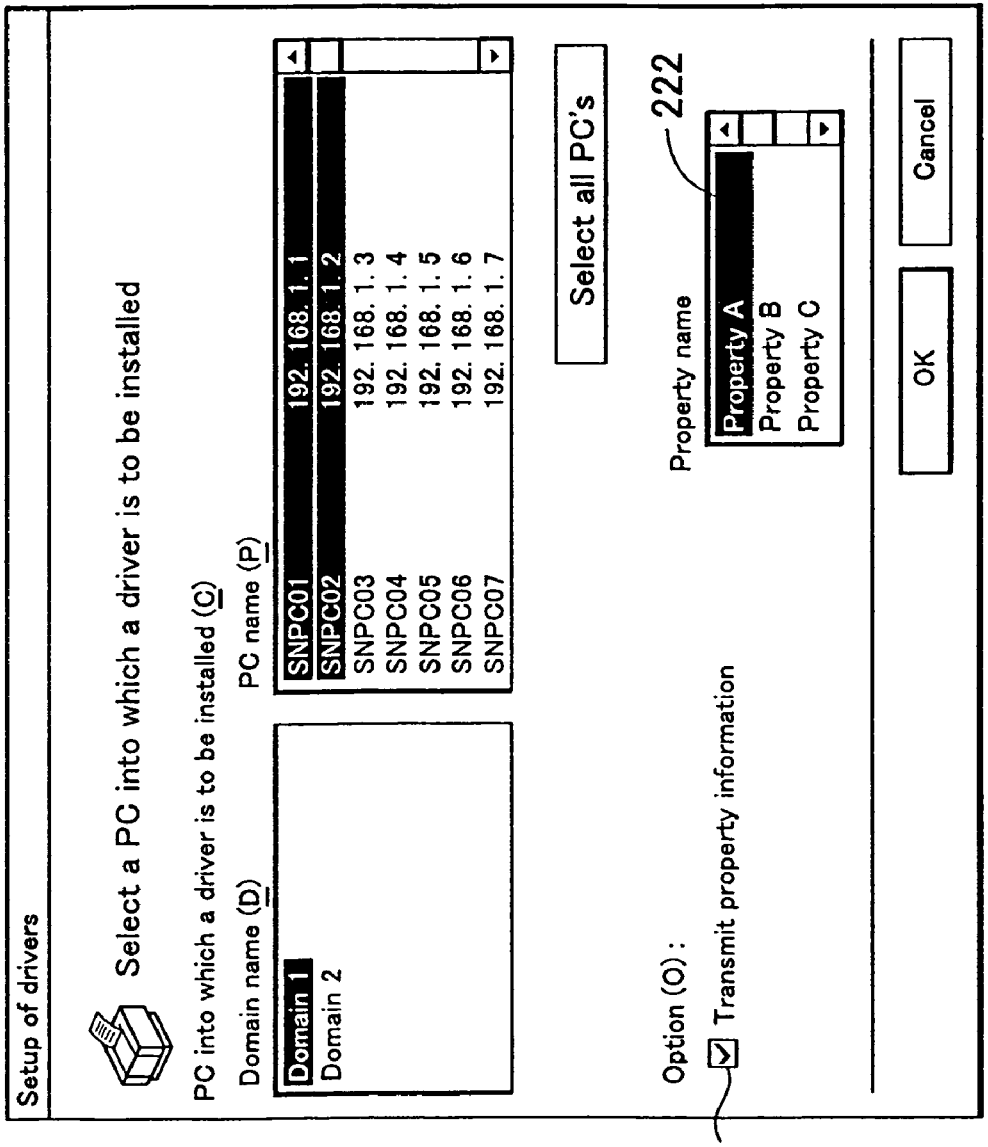
FIG. 22 is a diagram illustrating an example of a screen for selecting a client device into which a driver is to be installed via the process shown in FIG. 19 and for specifying whether to set property information.

If a "OK" button on the screen shown in FIG. 21 is clicked, a screen shown in FIG. 22 appears, and process proceeds to step S1903 and further to step S1904.

In step S1903, in accordance with information inputted via the screen shown in FIG. 22, the setup program in the installation server device 385 selects a client device to which a selected driver is to be installed. Herein, a plurality of client devices may be selected at the same time.

FIG. 22 illustrates an example of a screen for designating a client device to which a driver is to be installed and for setting associated property information, via the process shown in FIG. 19. Herein, a plurality of client devices may be selected at the same time. The setting of property information can be turned on/off by checking a property information transmission box 221. A property information file, created via the setting screen shown in FIG. 17, to be transmitted to each client device is selected in a property information file selection box 222. In the example shown in FIG. 22, property information A is selected. Although in this example, one or more client devices within a domain are selected, client devices located in different domains may also be selected.

In step S1904, the setup program in the installation server device 385 determines whether to transmit the property information in accordance with the designation given via the property information transmission box 221. Furthermore, the setup program designates a property information name in accordance with the designation given via the property information file selection box 222.

Step S1905, the setup program in the installation server device 385 determines whether it is designated to perform setting of property information after completion of the installation of the driver into the client device. In the case where the setup program in the installation server device 385 determines that it is not designated to perform setting of property information of the driver at the client, the process proceeds to step S1907. On the other hand, if it is designated to perform setting of property information at the client, the process proceeds to step S1906. In step S1906, the setup program in the installation server device 385 automatically reads an external file that corresponds to the property information name designated in step S1904 and that includes the property information. The external file is created by the human manager and is automatically read from a directory, in the installation server device 385, in which the file designated in step S1904 is stored. The property information itself and the associated property information to be transmitted are added as setup information, and a command is issued to the OS to transmit the setup information to a specified client device.

In step S1907, the setup program (recognition means) in the server device 385 recognizes the setup information including the setup command associated with the driver, prepared in the previous step, and also recognizes a driver to be installed. Furthermore, the setup program determines and recognizes one or more client devices that have been designated, in step S1903, as devices to which the driver is to be installed. The setup program issues a command via an API to the OS to transmit the setup information to the client device, and ends the process. Preferably, the installation server 385 starts the transmission of the property information in response to a driver installation start command inputted at the installation server device 385.

In the process shown in FIG. 19, the type and the version of the OS are automatically determined by the installation server 385 in accordance with information, acquired and stored in advance, about the respective client devices. However, if the type and the version of the OS installed on a client device cannot be automatically determined, a user may input data indicating the type or version of the OS before the setup program generates the setup information in step S1902. To this end, the graphical user interface shown in FIG. 21 may be modified so that the type of the OS or the architecture of a CPU can be designated via the graphical user interface. Although, in the process described above with reference to FIG. 19, property information is autonomously transmitted without waiting for a request, the installation server 385 may transmit property information in response to a property information transmission request from a client device.

The property information is output by the driver as an external file and transmitted from the installation server device 385 to the client device, which in turn uses the received property information. The client device automatically reads the property information from the external file received from the installation server device 385 located outside the client device, and the read property information is written into the driver within the client device.

Furthermore, the objects of the present invention may also be achieved by supplying a software program code implementing the functions of any of the embodiments described above to a computer connected to a plurality of devices or to a computer in a system whereby the computer (CPU or MPU) in the system or the apparatus controls various devices in accordance with the program code. This technique also falls within the scope of the present invention.

In this case, it should be understood that the program code itself implements the functions of the invention and thus the program code itself and means for supplying the program code to the computer, such as a storage medium on which the program code is stored, fall within the scope of the present invention. Storage media which can be preferably employed in the present invention to store the program code include a floppy disk, a hard disk, an optical disk, a magneto-optical disk, a CD-ROM, a magnetic tape, a non-volatile memory card, and a ROM.

In the case where the functions of any embodiment described above are realized by executing the program code on the computer which operates under the control of an OS (operating system) or in the case where the functions of any embodiment described above are realized by executing the program code in cooperation with another application software, the program code also falls within the scope of the invention.

Furthermore, the program code may be stored into a memory provided on an expansion board inserted into the computer or an expansion unit connected to the computer, and a part of or the whole of process may be executed by a CPU or the like provided on the expansion board or the expansion unit thereby realizing the functions according to the invention. This technique also falls within the scope of the invention.

In the present invention, as described above, property information of drivers are shared on a network and can be updated via a simple operation. Furthermore, a server device is capable of setting property information that is common for all client devices.

Furthermore, in the present invention, as described above, property information associated with an existing driver installed in a client device is supplied from a server device and the driver of the client device is set in accordance with the supplied property information; thereby ensuring that the setting is performed easily and correctly without needing a troublesome operation of a human operator.

Furthermore, in the present invention, as described above, in response to a setup command issued at a server device, a driver may be push-installed and property information associated with driver may be set, thereby ensuring that the driver is installed and the associated property information is set easily and correctly without needing a troublesome operation at the client device.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A server device that communicates with a client device for push installation, comprising:
    a hardware processor, wherein the hardware processor comprises:
    a selecting unit for selecting at least one client device from plural client devices;
    a setting unit for setting whether or not to install property information with driver information via a user interface by using a setting dialog, wherein the property information includes a plurality of setting values for configuring the driver information for the at least one client device; and
    a transmission control unit of controlling a process for push installation of the driver information from the server device to the at least one client device, of transmitting to the at least one client device selected by the selecting unit, the property information and a setup command to set up the property information when the setting unit sets to install the property information with the driver information, and of transmitting to the at least one client device selected by the selecting unit, the driver information and not transmitting the property information with the driver information when the setting unit sets not to install the property information with the driver information.

2. A server device according to claim 1, wherein the setup command includes a command to control the at least one client device so as to register the property information in an OS.

3. A server device according to claim 2, further comprising a management unit of managing the property information for each printing device registered in the OS,
    wherein the transmission control unit controls a process of transmitting, to a printing device, property information corresponding to the printing device.

4. A server device according to claim 1, wherein the setup command includes a command to control the driver information so that the driver information reads the property information.

5. A server device according to claim 1, wherein the transmission control unit controls a process of transmitting the property information in response to a driver setting start command inputted at the server device.

6. A server device according to claim 1, wherein the transmission control unit controls a process of automatically reading property information generated by driver information in the server device and outputting the property information to the at least one client device.

7. A server device according to claim 1, wherein the setup command is transmitted by using a simple object access protocol.

8. A method, in a server device that communicates with a client device for push installation, for processing information, the method comprising the steps of:
    selecting at least one client device from plural client devices;
    setting whether or not to install property information with driver information via a user interface by using a setting dialog, wherein the property information includes a plurality of setting values for configuring the driver information for the at least one client device; and
    controlling a process for push installation of the driver information from the server device to the at least one client device, of transmitting to the at least one client device selected in the selecting step, the property information and a setup command to set up the property information when the setting step sets to install the property information with the driver information, and of transmitting to the at least one client device selected in the selecting step, the driver information and not transmitting the property information with the driver information when the setting step sets not to install the property information with the driver information.

9. A method for processing information according to claim 8, wherein the setup command includes a command to control the at least one client device so as to register the property information in an OS.

10. A method for processing information according to claim 9, further comprising the step of managing the property information for each printing device registered in the OS,
wherein the transmission control step includes a step of controlling a process of transmitting, to a printing device, property information corresponding to the printing device.

11. A method for processing information according to claim 8, wherein the setup command includes a command to control the driver information so that the driver information reads the property information.

12. A method of processing information according to claim 8, wherein the transmission control step includes a step of controlling a process of transmitting the property information in response to a driver setting start command inputted at the server device.

13. A method of processing information according to claim 8, wherein the transmission control unit controls a process of automatically reading property information generated by driver information in the server device and outputting the property information to the at least one client device.

14. A method for processing information according to claim 8, wherein the setup command is transmitted by using a simple object access protocol.

15. A control program stored on a computer-readable storage medium and executed in a server device that communicates with a client device for push installation, to control a process comprising the steps of:
selecting at least one client device from plural client devices;
setting whether or not to install property information with driver information via a user interface by using a setting dialog, wherein the property information includes a plurality of setting values for configuring the driver information for the at least one client device; and
controlling a process for push installation of the driver information from the server device to the at least one client device, of transmitting to the at least one client device selected in the selecting step, the property information and a setup command to set up the property information when the setting step sets to install the property information with the driver information, and of transmitting to the at least one client device selected in the selecting step, the driver information and not transmitting the property information with the driver information when the setting step sets not to install the property information with the driver information.

16. A control program according to claim 15, wherein the setup command includes a command to control the at least one client device so as to register the property information in an OS.

17. A control program according to claim 16, wherein the process further includes the step of managing the property information for each printing device registered in the OS,
wherein the transmission control step includes a step of controlling a process of transmitting, to a printing device, property information corresponding to the printing device.

18. A control program according to claim 15, wherein the setup command includes a command to control the driver information so that the driver information reads the property information.

19. A control program according to claim 15, wherein the transmission control step includes a step of controlling a process of transmitting the property information in response to a driver setting start command inputted at the server device.

20. A control program according to claim 15, wherein the transmission control step includes a step of controlling a process of automatically reading property information generated by driver information in the server device and outputting the property information to the at least one client device.

21. A control program according to claim 15, wherein the setup command is transmitted by using a simple object access protocol.

* * * * *